United States Patent
Jeong

(10) Patent No.: US 8,885,989 B2
(45) Date of Patent: Nov. 11, 2014

(54) OPTICAL HYBRID CIRCUIT, OPTICAL RECEIVER, OPTICAL TRANSCEIVER, AND LIGHT RECEIVING METHOD

(75) Inventor: Seok-Hwan Jeong, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 522 days.

(21) Appl. No.: 13/357,520

(22) Filed: Jan. 24, 2012

(65) Prior Publication Data
US 2012/0230631 A1 Sep. 13, 2012

(30) Foreign Application Priority Data
Mar. 9, 2011 (JP) ................................. 2011-051371

(51) Int. Cl.
*G02B 6/12* (2006.01)
*G02F 1/035* (2006.01)
*H04B 10/06* (2006.01)
*H04B 10/61* (2013.01)
*G02B 6/28* (2006.01)

(52) U.S. Cl.
CPC .......... *G02B 6/12004* (2013.01); *G02B 6/2813* (2013.01); *G02B 2006/12123* (2013.01); *H04B 10/615* (2013.01); *G02B 2006/12061* (2013.01)
USPC ...................................... 385/14; 385/1; 385/3

(58) Field of Classification Search
CPC ............. G02B 6/2813; G02B 6/29344; G02B 6/12014; H04B 10/611; H04B 10/613; G02F 2001/217
See application file for complete search history.

(56) References Cited

U.S. PATENT DOCUMENTS

| 8,306,369 | B2 * | 11/2012 | Jeong | 385/2 |
|---|---|---|---|---|
| 8,649,643 | B2 * | 2/2014 | Jeong | 385/39 |
| 2010/0166427 | A1 * | 7/2010 | Jeong | 398/82 |
| 2011/0158574 | A1 * | 6/2011 | Jeong | 385/2 |
| 2011/0229072 | A1 * | 9/2011 | Jeong | 385/14 |
| 2012/0002921 | A1 * | 1/2012 | Jeong | 385/32 |
| 2012/0106984 | A1 * | 5/2012 | Jones et al. | 398/214 |
| 2012/0237154 | A1 * | 9/2012 | Jeong | 385/1 |
| 2012/0243827 | A1 * | 9/2012 | Jeong | 385/24 |

FOREIGN PATENT DOCUMENTS

JP 2010-171922 8/2010

OTHER PUBLICATIONS

US 8,798,413, 08-2014, Jeong (withdrawn)*
Pennings, et al., "Ultracompact, All-Passive Optical 90°-Hybrid on InP Using Self-Imaging", IEEE Photonics Technology Letters, vol. 5, No. 6, Jun. 1993, pp. 701-703.

* cited by examiner

Primary Examiner — Michelle R Connelly
(74) Attorney, Agent, or Firm — Fujitsu Patent Center

(57) ABSTRACT

An optical hybrid circuit includes an MMI coupler including input channels provided at positions symmetrical first output channels, and second output channels, to convert multilevel modulation signal into first and second optical signals each having an in-phase relationship; first optical coupler coupled to one of the first and the second output channels, and having a branching ratio of 85:15 or 15:85, to convert the first optical signals into third optical signals having a 45- or 135-degree phase relationship; second optical coupler coupled to the other of the first and the second output channels, and having a same branching ratio as that of the first optical coupler, to convert the second optical signals into fourth optical signals having a 135- or 45-degree phase relationship; and a phase controlling region provided on at least one of one of the first output channels and one of the second output channels.

OPTICAL HYBRID CIRCUIT, OPTICAL RECEIVER, OPTICAL TRANSCEIVER, AND LIGHT RECEIVING METHOD

CROSS-REFERENCE TO RELATED APPLICATION

This application is based upon and claims the benefit of priority of the prior Japanese Patent Application No. 2011-051371, filed on Mar. 9, 2011, the entire contents of which are incorporated herein by reference.

FIELD

The embodiments discussed herein are related to an optical hybrid circuit, an optical receiver, an optical transceiver, and a light receiving method.

BACKGROUND

The recent upsurge in the network traffics has made the multilevel phase shift keying (MPSK) system or quadrature amplitude modulation (QAM) system as a promising candidate for an optical modulation system for enabling optical transmissions of 100 Gbit/s or higher, and development and research for such a technique have been intensified.

In order to demodulate signals modulated with such an optical modulation system, an optical receiver including a 90-degree hybrid is required. Here, the 90-degree hybrid exhibits output forms (patterns) having a different branching ratio, depending upon the modulation state of an MPSK signal or a QAM signal, and is the most important component of an optical receiver.

For example, a 90-degree hybrid having an optical waveguide structure which can be monolithically integrated, is constructed from a 4×4 multimode interference (MMI) coupler 100 having four channels on each of the input and output sides, as illustrated in FIG. 13.

It is to be noted that a 90-degree hybrid to demodulate quadrature phase shift keying (QPSK) signals is depicted in FIG. 13. In FIG. 13, the label "QPSK signal" denotes QPSK signal light, whereas the label "LO" denotes local oscillator (LO) light. The labels "I−" and "I+" denote in-phase component (I-component) with phases displaced by 180 degrees from each other, whereas labels "Q−" and "Q+" denote quadrature phase component (Q-component) with phases displaced by 90 degrees with respect to the I-component. It is to be noted that Q− and Q+ have their phases displaced by 180 degrees from each other.

In this 90-degree hybrid, by selecting, as input channels, two channels at positions asymmetrical with each other with respect to the center axis of the four input-side channels of the 4×4 MMI coupler 100, a relationship of phases displaced by 90 degrees from each other is provided by means of the mode interference inside the MMI region.

However, in this 90-degree hybrid, a pair of optical signals (I-component) having an in-phase relationship with each other is outputted from the outer two output channels of the 4×4 MMI coupler 100, and a pair of optical signals (Q-component) having a quadrature phase relationship with each other is outputted from the two inner output channels of the 4×4 MMI coupler 100. In short, a pair of optical signals having an in-phase relationship with each other is outputted from the outer two output channels spatially spaced away from each other. Therefore, where the 90-degree hybrid is coupled to photodiodes to carry out optoelectronic conversion, optical waveguides unavoidably intersect with each other, which give rise to excessive loss.

In order to eliminate intersecting of optical waveguides to reduce the excessive loss, a 90-degree hybrid including a 2×4 MMI coupler 101, a 2×2 optical coupler 102, and a phase shifter 103, as illustrated in FIG. 14, has been proposed.

It is to be noted that a 90-degree hybrid to demodulate a QPSK signal is depicted in FIG. 14. In FIG. 14, the label "QPSK signal" denotes QPSK signal light, whereas the label "LO" denotes LO light. The labels "I−" and "I+" denote I-component with phases displaced by 180 degrees from each other, whereas labels "Q−" and "Q+" denote Q-component with phases displaced by 90 degrees with respect to the I-component. It is to be noted that Q− and Q+ have their phases displaced by 180 degrees from each other.

SUMMARY

An optical hybrid circuit includes: a multimode interference coupler including a pair of input channels provided at positions symmetrical with each other with respect to a center position in a widthwise direction thereof, a pair of first output channels adjacent with each other to output a pair of first optical signals having an in-phase relationship with each other, and a pair of second output channels adjacent with each other to output a pair of second optical signals having an in-phase relationship with each other, the multimode interference coupler being adapted to convert multilevel modulation signal light into the pair of first optical signals having an in-phase relationship with each other and the pair of second optical signals having an in-phase relationship with each other; a first optical coupler coupled to one of the first output channels and the second output channels, having two channels on the input side thereof and two channels on the output side thereof, and having a branching ratio of 85:15 or 15:85, the first optical coupler being adapted to convert the first optical signals into a pair of third optical signals having a 45- or 135-degree phase relationship with each other; a second optical coupler coupled to the other of the first output channels and the second output channels, having two channels on the input side thereof and two channels on the output side thereof, and having a same branching ratio as the branching ratio of the first optical coupler, the second optical coupler being adapted to convert the second optical signals into a pair of fourth optical signals having a 135- or 45-degree phase relationship with each other; and at least one phase controlling region provided on at least one of one of the pair of first output channels and one of the pair of second output channels.

An optical receiver includes the optical hybrid circuit described hereinabove; a photodiode adapted to convert the third optical signals outputted from the first optical coupler and the fourth optical signals outputted from the second optical coupler into an analog electric signal; an analog-digital conversion circuit adapted to convert the analog electric signal outputted from the photodiode into a digital electric signal; and a digital electric circuit adapted to execute arithmetic processing using the digital electric signal outputted from the analog-digital conversion circuit.

A light receiving method includes: converting, using a multimode interference coupler including a pair of input channels provided at positions symmetrical with each other with respect to a center position in a widthwise direction thereof, a pair of first output channels adjacent with each other to output a pair of first optical signals having an in-phase relationship with each other, and a pair of second output channels adjacent with each other to output a pair of second optical signals having an in-phase relationship with each other, multilevel modulation signal light into the pair of first optical signals having an in-phase relationship with each other and the pair of second optical signals having an in-phase relationship with each other; controlling a phase difference between a pair of optical signals of at least one of the pair of first optical signals and the pair of second optical signals, with at least one phase controlling region provided on at least one of one of the pair of first output channels and one of the pair of second output channels; converting the pair of first optical signals into a pair of third optical signals having a 45- or 135-degree phase relationship with each other, using a first optical coupler coupled to one of the first output channels and the second output channels, having two channels on the input side thereof and two channels on the output side thereof, and having a branching ratio of 85:15 or 15:85; converting the pair of second optical signals into a pair of fourth optical signals having a 135- or 45-degree phase relationship with each other, using a second optical coupler coupled to the other of the first output channels and the second output channels, having two channels on the input side thereof and two channels on the output side thereof, and having a same branching ratio as the branching ratio of the first optical coupler; and receiving the pair of third optical signals and the pair of fourth optical signals.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
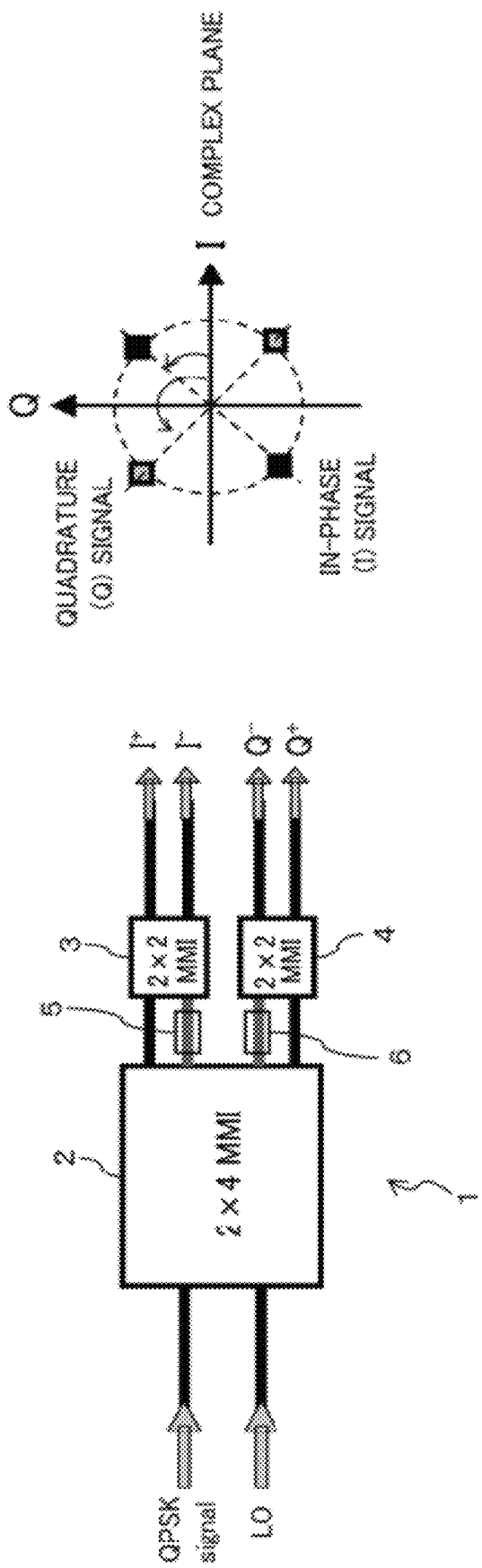
FIG. 1A is a schematic view illustrating a configuration of an optical hybrid circuit according to a first embodiment.
FIG. 1B is a phase relationship diagram illustrating a phase relationship among lights outputted from each of channels of the optical hybrid circuit illustrated in FIG. 1A.

In the above-described 90-degree hybrid using the 4×4 MMI coupler 100, the intersecting of optical waveguide between the 4×4 MMI coupler and photodiodes (not illustrated) cannot be avoided, which makes equalizing the losses between I-component and Q-component impossible. Thus, equalizing the reception efficiencies between the I-component and the Q-component in an optical receiver including this 90-degree hybrid is theoretically difficult.

In the above-described 90-degree hybrid using the 2×4 MMI coupler 101 and the 2×2 optical coupler 102, intersecting of optical waveguides is avoided, but the losses cannot be equalized between I-component and Q-component, since only the Q-component propagate through the 2×2 MMI coupler. Thus, equalizing the reception efficiencies between the I-component and the Q-component in an optical receiver including this 90-degree hybrid is also difficult.

Therefore, an optical hybrid circuit is desired where the losses are equalized between I-component and Q-component. Further, an optical receiver, an optical transceiver, and a light receiving method are desired where the reception efficiencies are equalized between I-component and Q-component.

In the following, an optical hybrid circuit, an optical receiver, an optical transceiver, and a light receiving method according to embodiments will be described with reference to the drawings.

First Embodiment

First, an optical hybrid circuit according to a first embodiment will be described with reference to FIGS. 1A to 6.

The optical hybrid circuit according to the present embodiment is a 90-degree hybrid circuit (hereinafter, also referred to as 90-degree hybrid) used for identification (demodulation) of an MPSK signal or a QAM signal in an optical transmission system or an optical communication system. This 90-degree hybrid provides output forms (patterns) having different branching ratios depending upon the modulation state of an MPSK signal or a QAM signal.

Hereinafter, a 90-degree hybrid to demodulate a QPSK signal will be described as an example of an optical hybrid circuit.

In the present embodiment, as illustrated in FIG. 1A, a 90-degree hybrid 1 includes a multimode interference (MMI) coupler 2 at a preceding stage and two optical couplers 3 and 4 at a succeeding stage, which are coupled in cascade connection to each other, and phase controlling regions 5 and 6 are provided between the MMI coupler 2 and the respective optical couplers 3 and 4. This 90-degree hybrid 1 is constructed from an optical semiconductor device having a waveguide structure, which includes the MMI coupler 2, the two optical couplers 3 and 4, and the phase controlling regions 5 and 6, and can be monolithically integrated.

In FIG. 1, the label "QPSK signal" denotes QPSK signal light, whereas the label "LO" denotes LO light. The labels "I⁻" and "I⁺" denote I-component with phases displaced by 180 degrees from each other, whereas labels "Q⁻" and "Q⁺" denote Q-component with phases displaced by 90 degrees with respect to the I-component. It is to be noted that Q⁻ and Q⁺ have their phases displaced by 180 degrees from each other. Further, the phase relationship diagram of FIG. 1B illustrates a phase relationship among optical signals outputted in accordance with a relative phase difference between the QPSK signal light and the LO light.

Here, the MMI coupler 2 at the preceding stage is a 2×4 MMI coupler which has two channels on the input side thereof and has four channels on the output side thereof. It is to be noted that channels are also referred to as ports.

In particular, the MMI coupler 2 is a 2×4 MMI coupler which is based on paired interference (PI). In other words, the MMI coupler 2 is a 2×4 MMI coupler wherein the centers of the two input channels are positioned at 1/3 and 2/3 from the upper side of the MMI width and higher-order modes of the $(3s-1)^{th}$ order (s is a natural number equal to or greater than 1) is not excited in the MMI region. This configuration can help to reduce the device length.

It is to be noted that, while a 2×4 MMI coupler based on PI is used here, the MMI coupler 2 is not limited to this, but a 2×4 MMI coupler may be used which has a structure having a center symmetric property such that a pair of input channels are provided at symmetrical positions with respect to the center portion in the widthwise direction. For example, a 2×4 MMI coupler based on general interference (GI) may be used. In particular, a 2×4 MMI coupler may be used wherein the centers of the two input channels are positioned in a region except the positions of 1/3 and 2/3 of the MMI width within a range within which the center symmetric property of the MMI region is not lost and all modes according to the MMI width are excited.

Each of the optical couplers 3 and 4 at the succeeding stage is a 2×2 optical coupler which has two channels on the input side thereof and has two channels on the output side thereof, and has a branching ratio (asymmetric branching ratio) of 85:15 (cross:bar). It is to be noted that channels are also referred to as ports. In the 2×2 optical coupler having a branching ratio of 85:15, inputted light couples to the cross port by 85%. It is to be noted that the optical coupler 3 is also referred to as a first optical coupler, whereas the optical coupler 4 is also referred to as a second optical coupler.

In the present embodiment, the 2×2 optical couplers 3 and 4 are 2×2 MMI couplers. The 2×2 MMI coupler 3 is coupled to the two output-side channels of the 2×4 MMI coupler 2 which are positioned on the first and the second from above (in other words, to a pair of first output channels adjacent with each other). Further, the 2×2 MMI coupler 4 is coupled to the two output-side channels of the 2×4 MMI coupler 2 which are positioned on the third and the fourth from above (in other words, to a pair of second output channels adjacent with each other). It is to be noted that the 2×2 MMI couplers 3 and 4 may be based on PI or on GI.

Being configured as described hereinabove, the present 90-degree hybrid 1 includes the two channels on the input side and the four channels on the output side. It is to be noted that channels are also referred to as ports.

To one of the input-side channels of the 90-degree hybrid 1, i.e., to one of the input-side channels of the 2×4 MMI coupler 2, QPSK signal light (multilevel modulation signal light) is inputted. In other words, one of the input-side channels of the 90-degree hybrid 1 is an input channel to input QPSK signal light. Meanwhile, to the other input-side channel of the 90-degree hybrid 1, i.e., to the other input-side channel of the 2×4 MMI coupler 2, LO light is inputted. In other words, the other input-side channel of the 90-degree hybrid 1 is an input channel to input LO light.

The QPSK signal light is converted by the 2×4 MMI coupler 2 into two pairs of in-phase signals, i.e., a pair of first optical signals having an in-phase relationship with each other and a pair of second optical signals having an in-phase relationship with each other.

The two pairs of in-phase signals converted by the 2×4 MMI coupler 2 are then rotated by 45 degrees and 135 degrees, by the 2×2 MMI couplers 3 and 4 having a branching ratio of 85:15, respectively, as illustrated in the phase relationship diagram in FIG. 1B.

More specifically, the pair of first optical signals is outputted from two output-side channels of the 2×4 MMI coupler 2 which are positioned on the first and the second from above, and inputted to the two input channels of the 2×2 MMI coupler 3. The pair of first optical signals having an in-phase relationship with each other is then converted by the 2×2 MMI coupler 3 into a pair of third optical signals having a 45-degree phase relationship with each other. The pair of third optical signals is then outputted from the two output channels of the 2×2 MMI coupler 3, i.e., the two output-side channels of the 90-degree hybrid 1 which are positioned on the first and the second from above.

It is to be noted that the pair of third optical signals having a 45-degree phase relationship with each other is a pair of optical signals with the phases advanced by 45 degrees with respect to the pair of first optical signals having an in-phase relationship with each other. Further, the pair of third optical signals having a 45-degree phase relationship with each other is a pair of optical signals positioned on the 45-degree axis displaced by 45 degrees with respect to the I axis in a phase relationship diagram, and are I-component (in-phase signals) having phases displaced by 180 degrees from each other.

Furthermore, the pair of second optical signals is outputted from two output-side channels of the 2×4 MMI coupler 2 which are positioned on the third and the fourth from above, and inputted to the two input channels of the 2×2 MMI coupler 4. The pair of second optical signals having an in-phase relationship with each other is then converted by the 2×2 MMI coupler 4 into a pair of fourth optical signals having a 135-degree phase relationship with each other. The pair of fourth optical signals is then outputted from the two output channels of the 2×2 MMI coupler 4, i.e., the two output-side channels of the 90-degree hybrid 1 which are positioned on the third and the fourth from above.

It is to be noted that the pair of fourth optical signals having a 135-degree phase relationship with each other is a pair of optical signals with the phases advanced by 135 degrees (or a pair of optical signals with the phases delayed by 45 degrees) with respect to the pair of second optical signals having an in-phase relationship with each other. Further, the pair of fourth optical signals having a 135-degree phase relationship with each other is a pair of optical signals positioned on the 135-degree axis displaced by 135 degrees with respect to the I axis in a phase relationship diagram, and have phases displaced by 180 degrees from each other and are Q-component (quadrature signals) having phases displaced by 90 degrees with respect to the I-component.

As described above, in the present 90-degree hybrid 1, the pair of third optical signals having phases displaced by 180 degrees from each other (I⁻ and I⁺, I-component) is outputted from the two output-side channels of the 90-degree hybrid 1 which are positioned on the first and the second from above, and the pair of fourth optical signals having phases displaced by 90 degrees with respect to the pair of third optical signals ($Q^-$ and $Q^+$, Q-component) is outputted from the two output-side channels of the 90-degree hybrid 1 which are positioned on the third and the fourth from above. Accordingly, optical waveguides are not required to be intersected for coupling to photodiodes for detecting these optical signals.

The output intensity ratio of the signal light outputted from the four output channels of the 90-degree hybrid 1 differs depending upon the phase (0, $\pi$, $-\pi/2$ and $+\pi/2$) of the QPSK signal light.

More specifically, using the pair of third optical signals outputted from the first and second output-side channels from above of the 90-degree hybrid 1, the relative phase difference between the QPSK signal light and the LO light $\Delta\rho$ of 0 and $\pi$, i.e., I-component ($\Delta\rho=0$ and $\pi$), can be identified. In that sense, the pair of third optical signals is a pair of optical signals capable of identifying the I-component in the QPSK signal light.

Further, using the pair of fourth optical signals outputted from the third and fourth output-side channels from above of the 90-degree hybrid 1, the relative phase difference between the QPSK signal light and the LO light $\Delta\rho$ of $-\pi/2$ and $+\pi/2$, i.e., Q-component ($\Delta\rho=-\pi/2$ and $+\pi/2$), can be identified. In that sense, the pair of fourth optical signals is a pair of optical signals capable of identifying the Q-component in the QPSK signal light.

As described above, two 2×2 MMI couplers 3 and 4 having an asymmetric branching ratio, provided at the succeeding stage of the 2×4 MMI coupler 2, function as a 90-degree hybrid. Particularly, since the pair of third optical signals (I-component) and the pair of fourth optical signals (Q-component) propagate through the 2×2 MMI couplers 3 and 4 having the identical configuration, no deviation of the losses is generated between the I-component and the Q-component. No deviation of the reception efficiencies is generated between the I-component and the Q-component in an optical receiver including such a 90-degree hybrid. If the two 2×2 MMI couplers 3 and 4 had a symmetric branching ratio (e.g., 50:50), they would not function as a 90-degree hybrid since two pairs of in-phase signals outputted from the 2×4 MMI coupler 2 would be converted into quadrature phase signals by the 2×2 MMI couplers 3 and 4.

For obtaining the above operation, a precondition should be met where a phase matching is established between output signals at the respective two pairs of output channels of the 2×4 MMI coupler 2 and the 2×2 MMI couplers 3 and 4.

In order to meet this precondition, in the present embodiment, as illustrated in FIG. 1A, phase controlling regions 5 and 6 capable of controlling the phase are provided between the 2×4 MMI coupler 2 and the respective 2×2 MMI couplers 3 and 4. It is to be noted that the phase controlling region 5 is also referred to as a first phase controlling region, whereas the phase controlling region 6 is also referred to as a second phase controlling region.

More specifically, the phase controlling region 5 is provided at one of the two output-side channels (the pair of first output channels) of the 2×4 MMI coupler 2 which are positioned on the first and the second from above. It is to be noted that the phase controlling region 5 may be configured as a region to control the phase such that the phase difference between the pair of first optical signals may be $\pi/2+s^*\pi$ (s is an integer). This enables identification of the I-component ($\Delta\Psi=0$ and $\pi$).

Further, the phase controlling region 6 is provided on one of the two output-side channels (the pair of second output channels) of the 2×4 MMI coupler 2 which are positioned on the third and the fourth from above. It is to be noted that the phase controlling region 6 may be configured as a region to control the phase such that the phase difference between the pair of second optical signals may be $\pi/2+p^*\pi$ (p is an integer). This enables identification of the Q-component ($\Delta\Psi=-\pi/2$ and $+\pi/2$).

It is to be noted that the two output-side channels of the 2×4 MMI coupler 2 which are positioned on the first and the second from above are channels between the two output-side ports of the 2×4 MMI coupler 2 which are positioned on the first and the second from above, and the two input-side ports of the 2×2 MMI coupler 3. Further, the two output-side channels of the 2×4 MMI coupler 2 which are positioned on the third and the forth from above are channels between the two output-side ports of the 2×4 MMI coupler 2 which are positioned on the third and the forth from above, and the two input-side ports of the 2×2 MMI coupler 4.

A phase shifter is provided in each of the phase controlling regions 5 and 6. More specifically, a phase shifter 5 is provided on the output channel of the 2×4 MMI coupler 2 positioned on the second from above, and a phase shifter 6 is provided on the output channel of the 2×4 MMI coupler 2 positioned on the third from above. A phase shifter that shifts the phase by varying the optical path length or a phase shifter that shifts the phase by varying the reflective index of the waveguide may be used as the phase shifters 5 and 6. For example, a delayed waveguide or a butterfly-type tapered waveguide having a varied width of the waveguide may be provided as the phase shifters. Further, for example, electrodes are provided such that phase control is carried out through current injection or voltage application, or heater electrodes may be provided to carry out phase control through application of heat.

The phase shifter 5 is adapted to induce a phase shift of $-\pi/4$. In other words, the phase shift amount $\theta_{p1}$ of the phase shifter 5 is $-\pi/4$ (radian). Thereby, the phase of light inputted to the input channel of the 2×2 MMI coupler 3 positioned on the second from above is made delayed by $\pi/4$ with respect to the phase of light inputted to the input channel of the 2×2 MMI coupler 3 positioned on the first from above. Then, the phase of light outputted from the output channel of the 2×4 MMI coupler 2 positioned on the second from above is delayed by $\pi/4$ with respect to the phase of light outputted from the output channel of the 2×4 MMI coupler 2 positioned on the first from above. As a result, the phase of light to be inputted to the input channel of the 2×2 MMI coupler 3 positioned on the second from above is delayed by $\pi/2$ with respect to the phase of light to be inputted to the input channel of the 2×2 MMI coupler 3 positioned on the first from above. In other words, the relative phase difference of light inputted to the two input-side channels of the 2×2 MMI coupler 3, i.e., the phase difference between the pair of first optical signals becomes $\pi/2$, and a phase matching is established.

As described above, the value obtained by subtracting the phase shift amount (here, $-\pi/4$) of the optical signal outputted from the output channel of the 2×4 MMI coupler 2 positioned on the second from above, from the phase shift amount (here, 0) of the optical signal outputted from the output channel of the 2×4 MMI coupler 2 positioned on the first from above may be $+\pi/4$. This is referred to as the phase matching condition.

Meanwhile, the phase shifter 6 is adapted to induce a phase shift of $-\pi/4$. In other words, the phase shift amount $\theta_{p2}$ of the phase shifter 6 is $-\pi/4$ (radian). Thereby, the phase of light inputted to the input channel of the 2×2 MMI coupler 4 positioned on the first from above is made delayed by $\pi/4$ with respect to the phase of light inputted to the input channel of the 2×2 MMI coupler 4 positioned on the second from above. Then, the phase of light outputted from the output channel of the 2×4 MMI coupler 2 positioned on the third from above is delayed by π/4 with respect to the phase of light outputted from the output channel of the 2×4 MMI coupler 2 positioned on the fourth from above. As a result, the phase of light to be inputted to the input channel of the 2×2 MMI coupler 4 positioned on the first from above is delayed by π/2 with respect to the phase of light to be inputted to the input channel of the 2×2 MMI coupler 4 positioned on the second from above. In other words, the relative phase difference of light inputted to the two input-side channels of the 2×2 MMI coupler 4, i.e., the phase difference between the pair of second optical signals becomes π/2, and a phase matching is established.

As described above, the value obtained by subtracting the phase shift amount (here, −π/4) of the optical signal outputted from the output channel of the 2×4 MMI coupler 2 positioned on the third from above, from the phase shift amount (here, 0) of the optical signal outputted from the output channel of the 2×4 MMI coupler 2 positioned on the fourth from above may be +π/4. This is referred to as the phase matching condition.

Now, an example of a particular configuration of an optical semiconductor device which constructs the present 90-degree hybrid 1 will be described with reference to FIG. 2.

The present 90-degree hybrid 1 is constructed from an optical semiconductor device including the multimode interference coupler 2, the optical couplers 3 and 4, and the phase controlling regions 5 and 6 described hereinabove, and having a waveguide structure. In other words, the present 90-degree hybrid 1 has a semiconductor waveguide structure wherein the multimode interference coupler 2, the optical couplers 3 and 4, and the phase controlling regions 5 and 6 described hereinabove are monolithically integrated. This contributes to reduce the size of the 90-degree hybrid 1.

Figure 2:
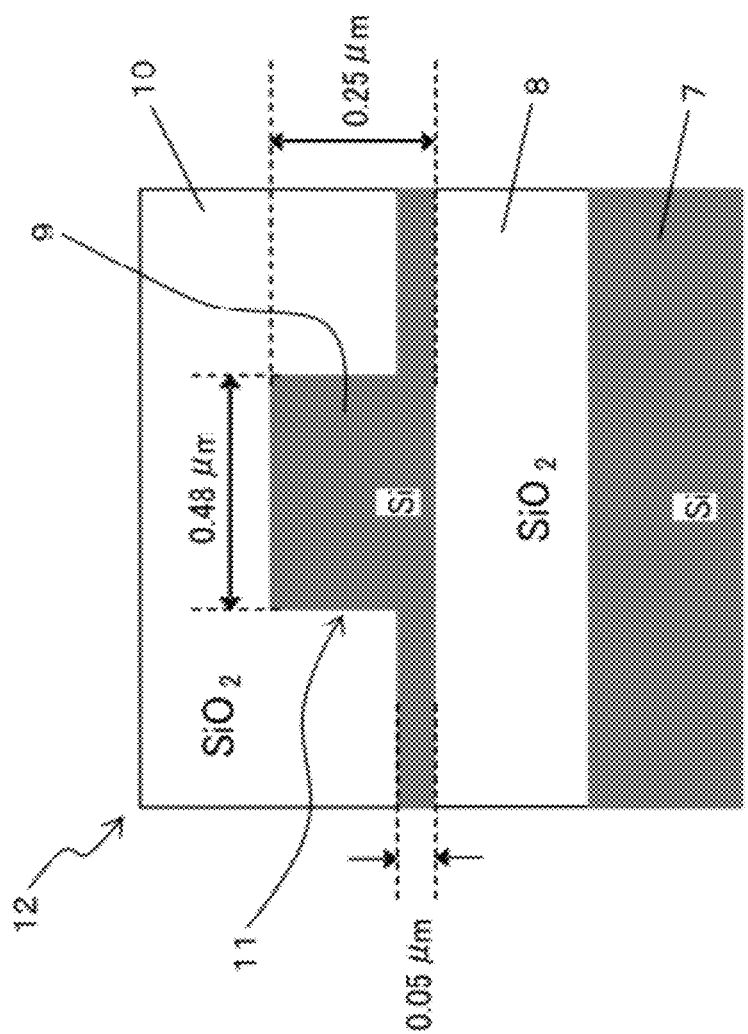
FIG. 2 is a schematic sectional view illustrating a configuration of an optical semiconductor device which constructs the optical hybrid circuit according to the first embodiment.
Figure 3:
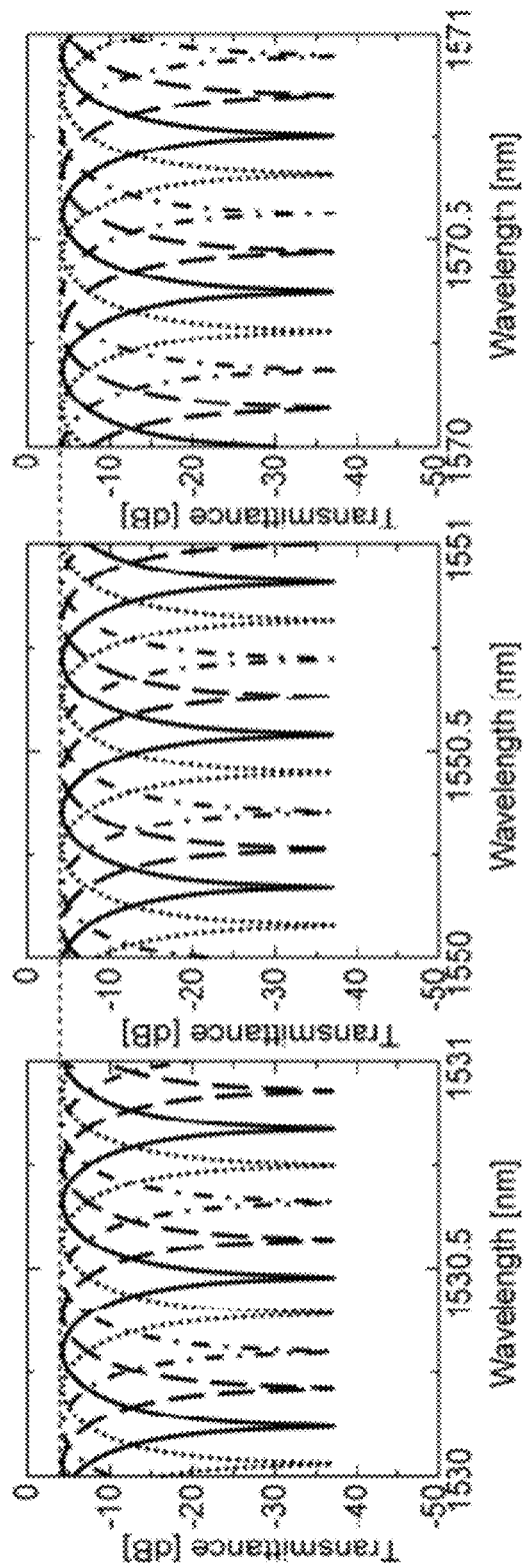
FIGS. 3A to 3C are diagrams illustrating the transmission spectrum in an example of the configuration of the 90-degree hybrid according to the first embodiment.
Figure 4:
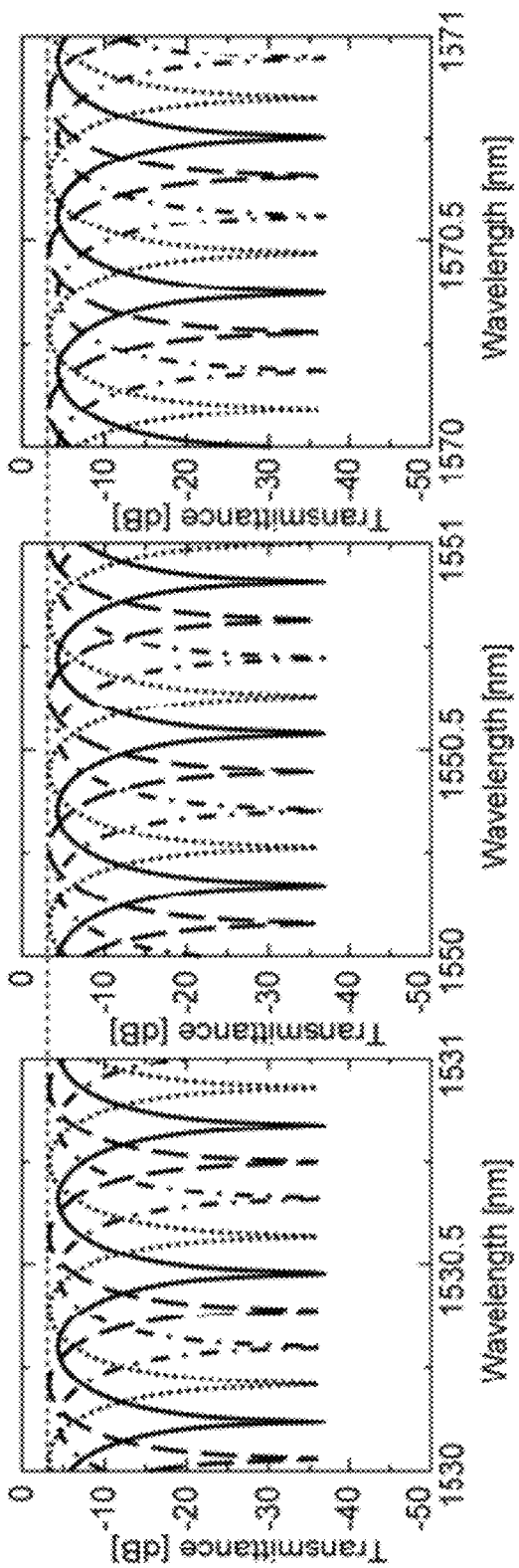
FIGS. 4A to 4C are diagrams illustrating the transmission spectrum in a 90-degree hybrid including a conventional 2×4 MMI coupler and 2×2 optical coupler.

In the present embodiment, the 90-degree hybrid 1 is an optical semiconductor device 12 including an SiO$_2$ film 8, an Si core layer 9, and an SiO$_2$ film 10 over an Si substrate 7, and having a rib waveguide structure 11, as illustrated in FIG. 2. It is to be noted that this rib waveguide structure 11 is also referred to as an Si wire structure.

Such a rib waveguide structure 11 has a higher relative reflective index difference, and exhibits an excellent mode confinement effect. This helps to reduce the size and cost of the optical semiconductor device 12 constructing the 90-degree hybrid 1.

Figure 13:
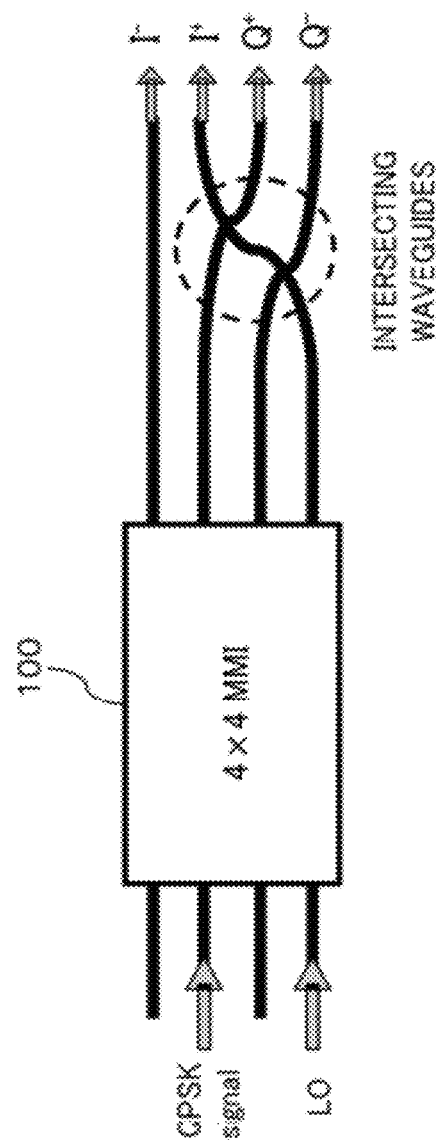
FIG. 13 is a schematic view illustrating the configuration of a conventional 90-degree hybrid including a 4×4 MMI coupler, and issues thereof.
Figure 14:
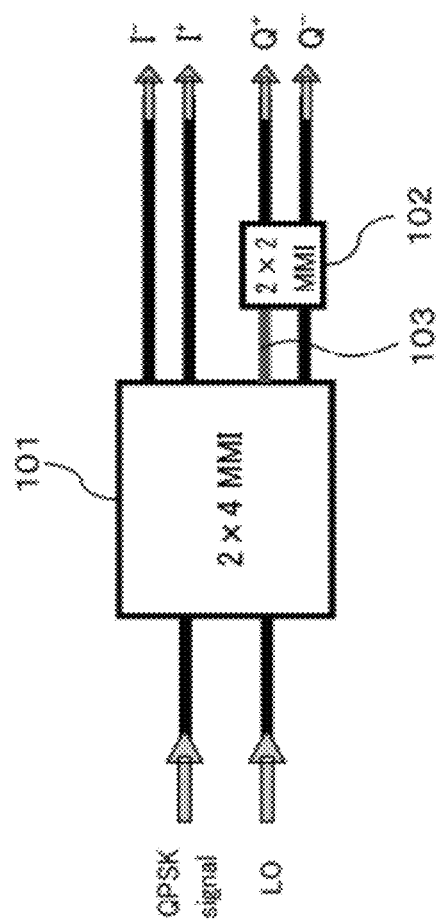
FIG. 14 is a schematic view illustrating the configuration of a conventional 90-degree hybrid including a 2×4 MMI coupler and a 2×2 optical coupler, and issues thereof.

For such a waveguide structure, as illustrated in FIG. 13, for example, if optical waveguides intersect with each other, excessive loss becomes significant, which makes equalizing the losses between I-component and Q-component difficult. Particularly, the higher the relative reflective index difference of the optical waveguides becomes, the more significant the excessive loss becomes, making equalizing the losses between the I-component and the Q-component more difficult. If a 2×2 MMI coupler is provided at the succeeding stage of 2×4 MMI coupler, as illustrated in FIG. 14, for example, the 2×2 MMI coupler becomes more susceptible to scattering loss as the relative reflective index difference of the optical waveguides increases, which may result in an excessive loss of about 1 dB, for example. Accordingly, equalizing the losses between the I-component and the Q-component becomes difficult. Equalizing the reception efficiencies between the I-component and the Q-component is also difficult in an optical receiver including such a 90-degree hybrid 1.

In contrast, since no intersecting of optical waveguides is required in the present embodiment, the losses can be equalized between I-component and Q-component even in cases where the waveguide structure as described above is used. Accordingly, the reception efficiencies can be equalized between I-component and Q-component in an optical receiver including the present 90-degree hybrid 1.

The 90-degree hybrid 1 constructed as an optical semiconductor device 12 in this manner is fabricated in the following manner.

Initially, as illustrated in FIG. 2, a silicon on insulator (SOI) substrate wherein an Si core layer 9 with a thickness of about 0.25 μm, for example, is formed over an Si substrate 7 sandwiching an SiO$_2$ film 8, is patterned to form a waveguide pattern by a light exposure process, for example.

It is to be noted that the waveguide pattern is defined by a photomask in a light exposure apparatus. It is to be noted that an electron beam exposure process may be used in place of the light exposure process. The waveguide pattern is also referred to as a waveguide stripe pattern. The SOI substrate is also referred to as an SOI wafer.

The SOI substrate is then processed by a dry etching, such as a reactive ion etching, for example, based on the defined waveguide pattern to form a rib waveguide structure 11. Specifically, the Si core layer 9 is processed to form a rib-type waveguide core. For example, the rib portion of the rib-type waveguide core has a width of about 0.48 μm and a thickness of about 0.25 μm. The slab portions extending at the ends of the rib-type waveguide core have a thickness of about 0.05 μm.

Thereafter, the rib-type waveguide core is covered with an SiO$_2$ film 10 using an evaporation apparatus, for example.

The 90-degree hybrid 1 constructed as the optical semiconductor device 12 is fabricated through the fabrication processes described above.

It is to be noted that, while an optical semiconductor device made from an Si-based semiconductor material has been described as an example, the semiconductor material is not limited to an Si-based semiconductor material. For example, the present 90-degree hybrid 1 may be formed from a Group III-V compound semiconductor material, such as InP and GaAs.

Now, FIGS. 3A to 3C illustrate the transmission spectrum of the present 90-degree hybrid 1. More specifically, FIGS. 3A, 3B, and 3C illustrate transmittances at wavelengths around 1.53 μm, 1.55 μm, and 1.57 μm, respectively.

It is to be noted that a delayed interferometer of a repetition frequency of 40 GHz was coupled to the input side of the 90-degree hybrid 1. Furthermore, the optical semiconductor device 12 constructing the 90-degree hybrid 1 having a rib waveguide structure 11, as illustrated in FIG. 2, was used, wherein the rib portion of the rib-type waveguide core has a width of about 0.48 μm and a thickness of about 0.25 μm and the slab portions have a thickness of about 0.05 μm. Further, the propagation losses and the excessive losses of the 2×2 MMI couplers 3 and 4 (having an MMI width of about 2.1 μm and an MMI length of about 17.7 μm, and a branching ratio of 85:15) were assumed to be 0.5 cm$^{-1}$ and 1 dB, respectively. The phase shift amounts $\theta_{p1}$ and $\theta_{p2}$ in the phase shifters 5 and 6 were assumed to be −π/4 (radian), respectively.

As illustrated in FIGS. 3A to 3C, the transmittances of light outputted from the four output channels (Ch-1, Ch-2, Ch-3, and Ch-4) change sinusoidally across the entire C band, depending on the relative phase difference between the wavelengths generated at the delayed interferometer at the preceding stage. The phases of the respective light are shifted by π/2 (radian) from each other, functioning as a 90-degree hybrid.

Particularly, it is understood that the losses are well balanced between I-component and Q-component, since the I-component (Ch-1 and Ch-2) and the Q-component (Ch-3 and Ch-4) propagate through the 2×2 MMI couplers 3 and 4 with the identical configuration. In an optical receiver including such a 90-degree hybrid 1, the reception efficiencies are equalized between I-component and Q-component even if output light from the 90-degree hybrid 1 is directly introduced to photodiodes, since the same currents flow through the photodiodes for the I-component and the Q-component. Further, any significant phase displacement was not observed across the C band, which indicates that the 90-degree hybrid 1 operates across the entire C band.

In contrast, FIGS. 4A to 4C illustrate the transmission spectrum in the 90-degree hybrid depicted in FIG. 14. More specifically, FIGS. 4A, 4B, and 4C illustrate transmittances at wavelengths around 1.53 µm, 1.55 µm, and 1.57 µm, respectively.

It is to be noted that this 90-degree hybrid is similar to that in FIGS. 3A to 3C in that a delayed interferometer is coupled and that the structure of the optical semiconductor device 12 constructing the 90-degree hybrid 1 is similar. However, the branching ratio of the 2×2 MMI coupler 102 is 50:50, and the phase shift amount θs in the phase shifter 103 is −π/4 (radian).

As illustrated in FIGS. 4A to 4C, the transmittances of light outputted from the four output channels (Ch-1, Ch-2, Ch-3, and Ch-4) change sinusoidally across the entire C band, depending on the relative phase difference between the wavelengths generated at the delayed interferometer at the preceding stage. The phases of the respective light are shifted by π/2 (radian) from each other, functioning as a 90-degree hybrid.

However, it can be understood that the losses are imbalanced between I-component and Q-component, since only the Q-component (Ch-3 and Ch-4) propagate through the 2×2 MMI coupler 102 and suffer from excessive loss. In an optical receiver including such a 90-degree hybrid, the reception efficiencies are not equalized between I-component and Q-component if output light from the 90-degree hybrid 1 is directly introduced to photodiodes, since the current flowing through the photodiodes is reduced only for the Q-component.

Figure 5:
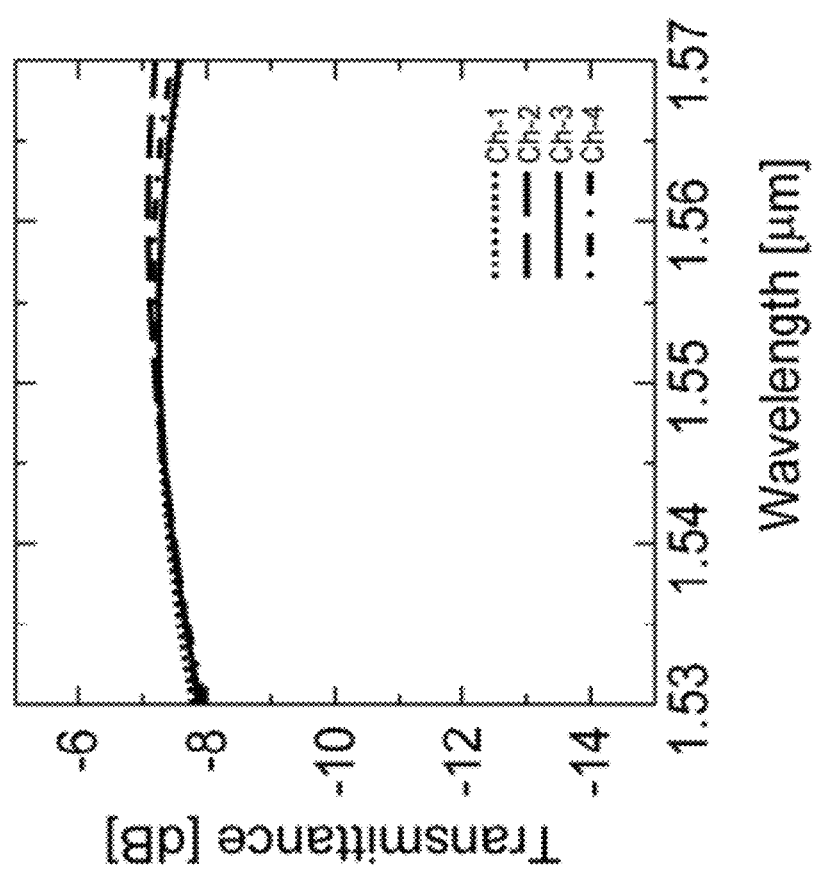
FIG. 5 is a diagram illustrating a wavelength dependency of the transmittance at the four output channels where signal light is inputted from one of two input channels in an example of the configuration of the 90-degree hybrid according to the first embodiment.

Now, FIG. 5 depicts a wavelength dependency of the transmittance at the four output channels (Ch-1, Ch-2, Ch-3, and Ch-4) where signal light is inputted from one of the two input channels in the present 90-degree hybrid 1. It is to be noted that the wavelength dependency is also referred to as the amplitude characteristic, or the branching characteristic where signal light is inputted from one of the two input channels.

It is to be noted that the optical semiconductor device 12 constructing the 90-degree hybrid 1 having a rib waveguide structure 11, as illustrated in FIG. 2, was used, wherein the rib portion of the rib-type waveguide core has a width of about 0.48 µm and a thickness of about 0.25 µm and the slab portions have a thickness of about 0.05 µm. Further, it was assumed that the 2×2 MMI couplers 3 and 4 have an MMI width of about 2.6 µm and an MMI length of about 13.5 µm, for obtaining a branching ratio of 85:15, and have an excessive loss of 1 dB. The phase shift amounts $θ_{p1}$ and $θ_{p2}$ in the phase shifters 5 and 6 were assumed to be −π/4 (radian), respectively.

As depicted in FIG. 5, it can be understood that the present 90-degree hybrid 1 has a low wavelength dependency in the C band range. More specifically, it can be understood that the difference in losses generated in the C band range is suppressed to about 1 dB or lower in the present 90-degree hybrid 1, and that a satisfactory branching characteristic is achieved. Further, the losses are well balanced between the I-component and the Q-component.

Figure 6:
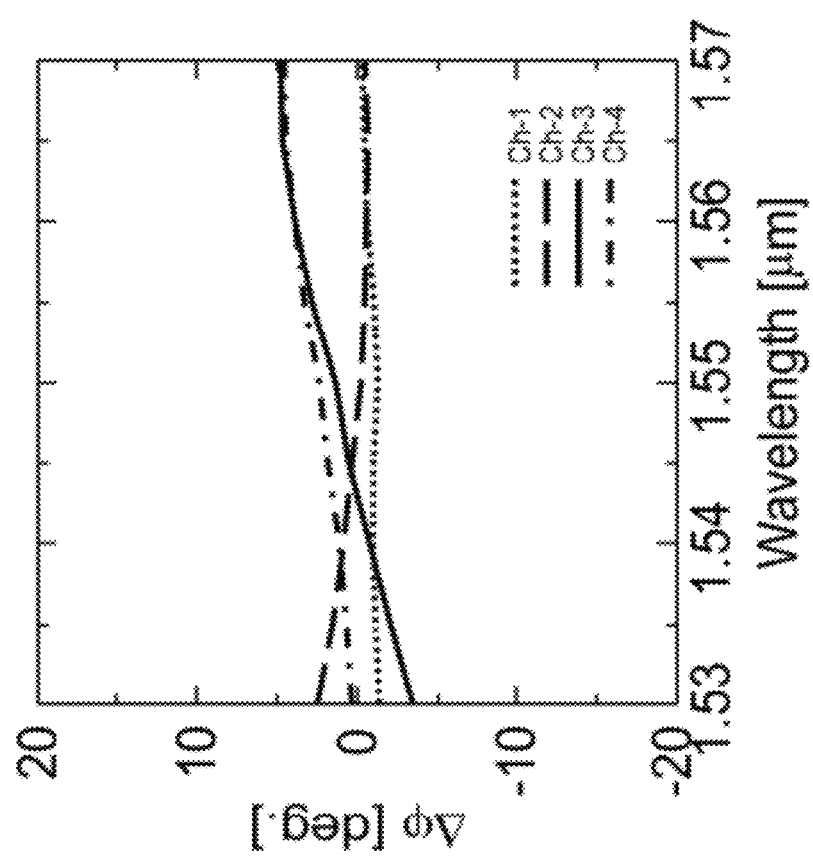
FIG. 6 is a diagram illustrating a wavelength dependency of the phase displacement amount Δϕ in an example of the configuration of the 90-degree hybrid according to the first embodiment.

Meanwhile, FIG. 6 illustrates a wavelength dependency of the phase displacement amount Δφ (relative phase displacement characteristic) of the present 90-degree hybrid 1.

It is to be noted that an optical semiconductor device 12 constructing the 90-degree hybrid 1 has the similar configuration as that in FIG. 5. In FIG. 6, the difference (phase displacement amount) Δφ between an absolute phase of an output component outputted from each of the four output channels (Ch-1, Ch-2, Ch-3, and Ch-4) and a reference phase is plotted where the relative phase difference between the QPSK signal light and the LO light is 0. Here, the reference phases are a phase of an output component outputted from each of the channels in the phase relationship diagrams illustrated in FIG. 1B. Meanwhile, the phase displacement amount is an excessive phase displacement amount from the reference phase. Accordingly, the smaller the phase displacement amount, the better. In order to demodulate a QPSK modulation signal in error-free, it is desirable that no phase displacement occurs. Even if phase displacement occurs, it is preferable to suppress it to the minimum, and usually it is desirable to suppress the phase displacement amount Δφ so as to be ±5 degrees or less.

As depicted in FIG. 6, in the present 90-degree hybrid 1, the phase displacement amount Δφ is suppressed to be ±5 degrees or less in the C band range. Thus, the present 90-degree hybrid 1 functions as an excellent 90-degree hybrid in the C band range.

In this manner, the present 90-degree hybrid 1 can lower the wavelength dependency of the transmittance and the phase displacement amount.

As described hereinabove, the optical hybrid circuit 1 according to the present embodiment is advantageous in that the losses can be equalized between I-component and Q-component. Accordingly, an optical receiver including this optical hybrid circuit 1 can receive I-component and Q-component with comparable efficiencies.

Particularly, the present optical hybrid circuit 1 is advantageous in that a 90-degree hybrid can be implemented which exhibits a low wavelength dependency and a low phase displacement characteristic (a wide band characteristic of an operating wavelength) at a wider wavelength band width, and is compact and suitable for monolithic integration.

In this manner, the present optical hybrid circuit 1 can achieve a 90-degree hybrid exhibiting an excellent loss balance between I-component and Q-component and operating at a wider wavelength band range (particularly, operating across the C band).

It is to be noted that, while, in the embodiment described above, a case wherein the 2×4 MMI coupler 2 is used as the MMI coupler at the preceding stage is taken as an example, the MMI coupler at the preceding stage is not limited to this. The MMI coupler at the preceding stage may be any MMI coupler which converts multilevel modulation signal light into a pair of first optical signals having an in-phase relationship with each other and a pair of second optical signals having an in-phase relationship with each other.

For example, the 2×4 MMI coupler 2 which constructs the 90-degree hybrid 1 of the embodiment described may be replaced by a 4×4 MMI coupler which has four channels on the input side and four channels on the output side thereof, and has a structure having a center symmetric property. For example, a 4×4 MMI coupler may be used which is a 4×4 MMI coupler based on GI and wherein the two input channels are positioned in a region except the positions of 1/3 and 2/3 of the MMI width within a range within which the center symmetric property of the MMI region is not lost and all modes according to the MMI width are excited. And, if signal light and LO light are inputted to the two channels (a pair of input channels) provided at symmetrical positions with respect to the center position in the widthwise direction from among the four input-side channels of the 4×4 MMI coupler 2A, then 90-degree hybrid operation is obtained similarly as in the case of the embodiment described above. Also in this case, optical waveguides are not required to be intersected for coupling to photodiodes.

Further, while, in the embodiment described above, a case wherein 2×2 MMI couplers are used as the two optical couplers 3 and 4 at the succeeding stage is described as an example, the optical couplers 3 and 4 are not limited to these. For example, the 2×2 MMI couplers 3 and 4 which construct the optical hybrid circuit 1 of the embodiment described above may be replaced by a directional coupler (for example, a 2×2 directional coupler). Also in this case, similar effects to those of the embodiment described hereinabove are obtained. However, MMI couplers are preferred considering the fabrication tolerance and the yield.

Figure 7B:
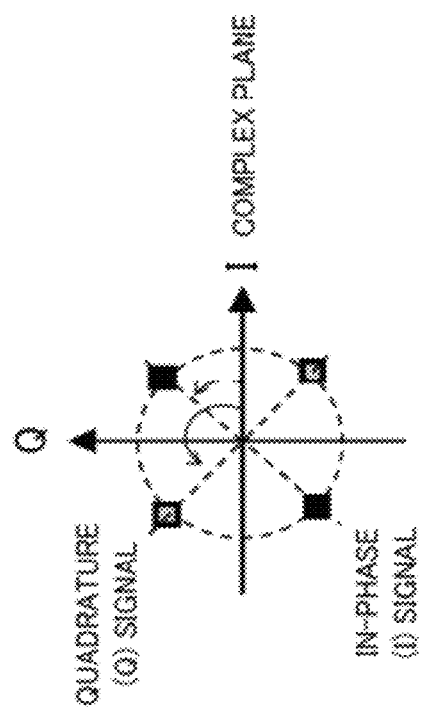
FIG. 7B is a phase relationship diagram illustrating a phase relationship among lights outputted from each of channels of the optical hybrid circuit illustrated in FIG. 7A.

Further, while, in the embodiment described above, a case wherein 2×2 MMI couplers having a branching ratio of 85:15 are used as the two 2×2 MMI couplers 3 and 4 at the succeeding stage is described as an example, the 2×2 MMI couplers 3 and 4 are not limited to these. For example, as illustrated in FIG. 7, 2×2 MMI couplers 3A and 4A having a branching ratio of 15:85 (cross:bar) as the two 2×2 MMI coupler at the succeeding stage. It is noted that, in the 2×2 MMI couplers 3A and 4A having a branching ratio of 15:85, inputted light couples to the cross port by 15%. The phase shifters 5 and 6 may be configured similarly as in the embodiment described hereinabove. In this case, a pair of first optical signals having an in-phase relationship with each other is then converted by the 2×2 MMI coupler 3A into a pair of third optical signals having a 135-degree phase relationship with each other, and a pair of second optical signals having an in-phase relationship with each other is then converted by the 2×2 MMI coupler 4A into a pair of fourth optical signals having a 45-degree phase relationship with each other. The pair of fourth optical signals having phases displaced by 180 degrees from each other (I$^-$ and I$^+$, I-component, in-phase signals) is outputted from the two output-side channels of the 90-degree hybrid 1 which are positioned on the third and the fourth from above, and the pair of third optical signals having phases displaced by 90 degrees with respect to the pair of fourth optical signals (Q$^-$ and Q$^+$, Q-component, quadrature signals) is outputted from the two output-side channels of the 90-degree hybrid 1 which are positioned on the first and the second from above. Also in this case, similar to the embodiment described hereinabove, a 90-degree hybrid exhibiting the characteristics as illustrated in FIGS. 3A to 3C, 5 and 6 can be implemented.

It is to be noted that, while, in the embodiment described above, a case wherein the phase controlling region (phase shifter) 5 is provided between the output channel (port) of the 2×4 MMI coupler 2 positioned on the second from above and the input channel (port) of the 2×2 MMI coupler 3 positioned on the second from above, and a phase controlling region (phase shifter) 6 is provided between the output channel (port) of the 2×4 MMI coupler 2 positioned on the third from above and the input channel (port) of the 2×2 MMI coupler 4 positioned on the first from above is described as an example, this is not limiting.

Figure 8:
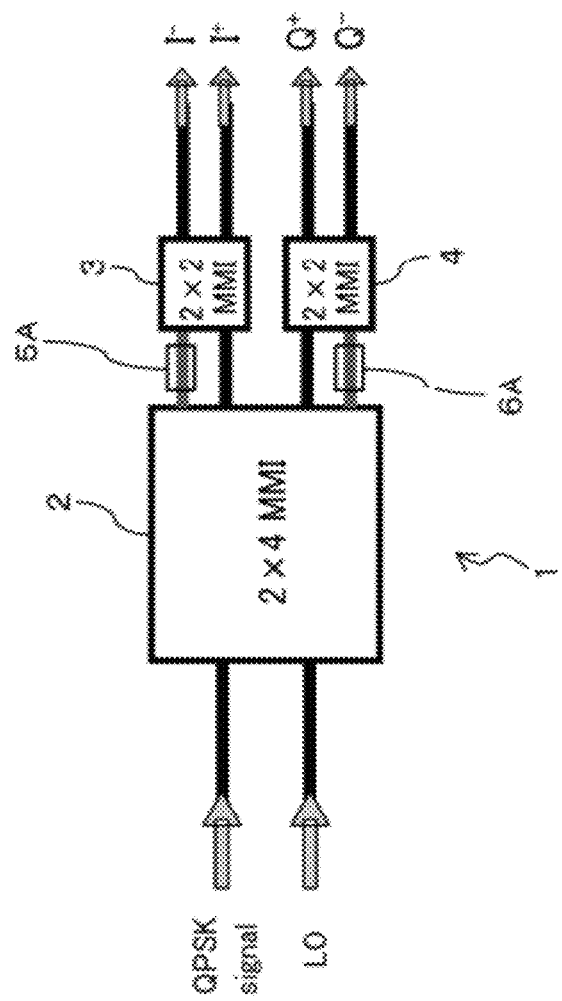
FIG. 8 is a schematic view illustrating a configuration of an optical hybrid circuit according to a further modification to the first embodiment.

For example, as illustrated in FIG. 8, a phase controlling region (phase shifter) 5A may be provided between the output channel (port) of the 2×4 MMI coupler 2 positioned on the first from above and the input channel (port) of the 2×2 MMI coupler 3 positioned on the first from above, and a phase controlling region (phase shifter) 6A may be provided between the output channel (port) of the 2×4 MMI coupler 2 positioned on the fourth from above and the input channel (port) of the 2×2 MMI coupler 4 positioned the second from above. In other words, the phase controlling region 5A may be provided at the other of the pair of output channels (the pair of first output channels adjacent with each other) of the 2×4 MMI coupler to which the 2×2 MMI coupler 3 is coupled, and the phase controlling region 6A may be provided at the other of the pair of output channels (the pair of second output channels adjacent with each other) of the 2×4 MMI coupler 2 to which the 2×2 MMI coupler 4 is coupled.

In this case, the phase shifter 5A is adapted to induce a phase shift of +π/4. Thereby, the value obtained by subtracting the phase shift amount (here, 0) of the optical signal outputted from the output channel of the 2×4 MMI coupler 2 positioned on the second from above, from the phase shift amount (here, +π/4) of the optical signal outputted from the output channel of the 2×4 MMI coupler 2 positioned on the first from above may be +π/4. In other words, the phase matching condition is satisfied by adjusting the phase shift amount $\theta_{Q1}$ of the phase shifter 5A in this manner.

Meanwhile, the phase shifter 6A is adapted to induce a phase shift of +π/4. Thereby, the value obtained by subtracting the phase shift amount (here, 0) of the optical signal outputted from the output channel of the 2×4 MMI coupler 2 positioned on the third from above, from the phase shift amount (here, +π/4) of the optical signal outputted from the output channel of the 2×4 MMI coupler 2 positioned on the fourth from above may be +π/4. In other words, the phase matching condition is satisfied by adjusting the phase shift amount $\theta_{Q2}$ of the phase shifter 6A in this manner.

Also in this configuration, similar to the embodiment described hereinabove, a 90-degree hybrid exhibiting the characteristics as illustrated in FIGS. 3A to 3C, 5 and 6 can be implemented.

Further, for example, the configuration illustrated in FIG. 1A and the configuration illustrated in FIG. 8 may be combined. More specifically, phase controlling regions (phase shifters) 5 and 5A may be provided between the output channel (port) of the 2×4 MMI coupler 2 positioned on the first from above and the input channel (port) of the 2×2 MMI coupler 3 positioned on the first from above, and between the output channel (port) of the 2×4 MMI coupler 2 positioned on the second from above and the input channel (port) of the 2×2 MMI coupler 3 positioned on the second from above, respectively; and phase controlling regions (phase shifters) 6 and 6A may be provided between the output channel (port) of the 2×4 MMI coupler 2 positioned on the third from above and the input channel (port) of the 2×2 MMI coupler 4 positioned on the first from above, and between the output channel (port) of the 2×4 MMI coupler 2 positioned on the fourth from above and the input channel (port) of the 2×2 MMI coupler 4 positioned on the second from above, respectively. In other words, the phase controlling regions 5 and 5A may be provided at both of the pair of output channels (the pair of first output channels adjacent with each other) of the 2×4 MMI coupler to which the 2×2 MMI coupler 3 is coupled, and the phase controlling regions 6 and 6A may be provided at both of the pair of output channels (the pair of second output channels adjacent with each other) of the 2×4 MMI coupler 2 to which the 2×2 MMI coupler 4 is coupled.

In this case, one of the two phase shifters 5 and 5A, i.e., the phase shifter 5A provided between the output channel of the 2×4 MMI coupler 2 positioned on the first from above and the input channel of the 2×2 MMI coupler 3 positioned on the first from above, is adapted to induce a phase shift of +π/8. In contrast, the other of the two phase shifters 5 and 5A, i.e., the phase shifter 5 provided between the output channel of the 2×4 MMI coupler 2 positioned on the second from above and the input channel of the 2×2 MMI coupler 3 positioned on the second from above, is adapted to induce a phase shift of −π/8. Thereby, the value obtained by subtracting the phase shift amount (here, −π/8) of the optical signal outputted from the output channel of the 2×4 MMI coupler 2 positioned on the second from above, from the phase shift amount (here, +π/8) of the optical signal outputted from the output channel of the 2×4 MMI coupler 2 positioned on the first from above may be adjusted to +π/4. In other words, the phase matching condition is satisfied by adjusting the phase shift amounts by the two phase shifters 5 and 5A in this manner.

Further, one of the two phase shifters 6 and 6A, i.e., the phase shifter 6 provided between the output channel of the 2×4 MMI coupler 2 positioned on the third from above and the input channel of the 2×2 MMI coupler 4 positioned on the first from above, is adapted to induce a phase shift of −π/8. In contrast, the other of the two phase shifters 6 and 6A, i.e., the phase shifter 6A provided between the output channel of the 2×4 MMI coupler 2 positioned on the fourth from above and the input channel of the 2×2 MMI coupler 4 positioned on the second from above, is adapted to induce a phase shift of +π/8. Thereby, the value obtained by subtracting the phase shift amount (here, −π/8) of the optical signal outputted from the output channel of the 2×4 MMI coupler 2 positioned on the third from above, from the phase shift amount (here, +π/8) of the optical signal outputted from the output channel of the 2×4 MMI coupler 2 positioned on the fourth from above may be +π/4. In other words, the phase matching condition is satisfied by adjusting the phase shift amounts by the two phase shifters 6 and 6A in this manner.

Also in this configuration, similar to the embodiment described hereinabove, a 90-degree hybrid exhibiting the characteristics as illustrated in FIGS. 3A to 3C, 5 and 6 can be implemented.

As described above, the positions of the phase shifters (phase controlling regions) and the phase shift amounts of the phase shifters may be adjusted to any values, as long as the phase matching condition is satisfied. Stated differently, the configurations for implementing a 90-degree hybrid exhibiting the characteristics as illustrated in FIGS. 3A to 3C, 5 and 6 are not limited to the one in the embodiment described hereinabove.

Further, the present 90-degree hybrid 1 may be configured to include a phase controlling region in at least one of one of the pair of first output channels and one of the pair of second output channels, to which the 2×2 optical couplers 3 and 4 are coupled. In other words, in the embodiment described hereinabove and the modification thereof, a case where the phase controlling regions 5 and 6 are provided at both of the two pairs of output channels to which the 2×2 optical couplers 3 and 4 are coupled, this is not limiting. For example, a phase controlling region may be omitted from one of the two pairs of output channels by modifying the configuration of (for example, by tapering) the 2×4 MMI coupler (multimode interference coupler) 2, thereby providing the 2×4 MMI coupler 2 with the function of a phase controlling region. Thus, one or more phase controlling regions may be provided to one or both of at least one pair of output channels of the two pairs of output channels to which the 2×2 optical couplers 3 and 4 are coupled.

In this case, the phase controlling region(s) is a region to control the phase such that one of the phase difference between the pair of first optical signals and the phase difference between the pair of second optical signals is π/2+s*π (s is an integer). Further, the multimode interference coupler is adapted such that the other of the phase difference between the pair of first optical signals and the phase difference between the pair of second optical signals is π/2+p*π (p is an integer).

It is to be noted that, while, the embodiment described above is described in the context of the 90-degree hybrid 1 to demodulate QPSK signals, the 90-degree hybrid 1 is not limited to this. More specifically, by performing digital signal processing on light intensity information obtained with the above-described 90-degree hybrid (by tracking electric field information on the complex plane, for example), other phase modulation signals and intensity modulation signals, such as MPSK signals and QAM signals, can be demodulated. Thus, the 90-degree hybrid described above can be employed for demodulating a wide variety of signals, including phase modulation signals and intensity modulation signals.

Second Embodiment

Now, an optical receiver, an optical transceiver, and a light reception method according to a second embodiment will be described with reference to FIG. 9.

The optical receiver according to the present embodiment is a coherent optical receiver 20 including the optical hybrid circuit 1 (90-degree hybrid for a QPSK signal; refer to FIG. 1A) of the first embodiment described above as illustrated in FIG. 9. The coherent optical receiver 20 is adapted to convert an optical signal identified by the 90-degree hybrid 1 into electric signals and carries out a signal processing.

Figure 9:
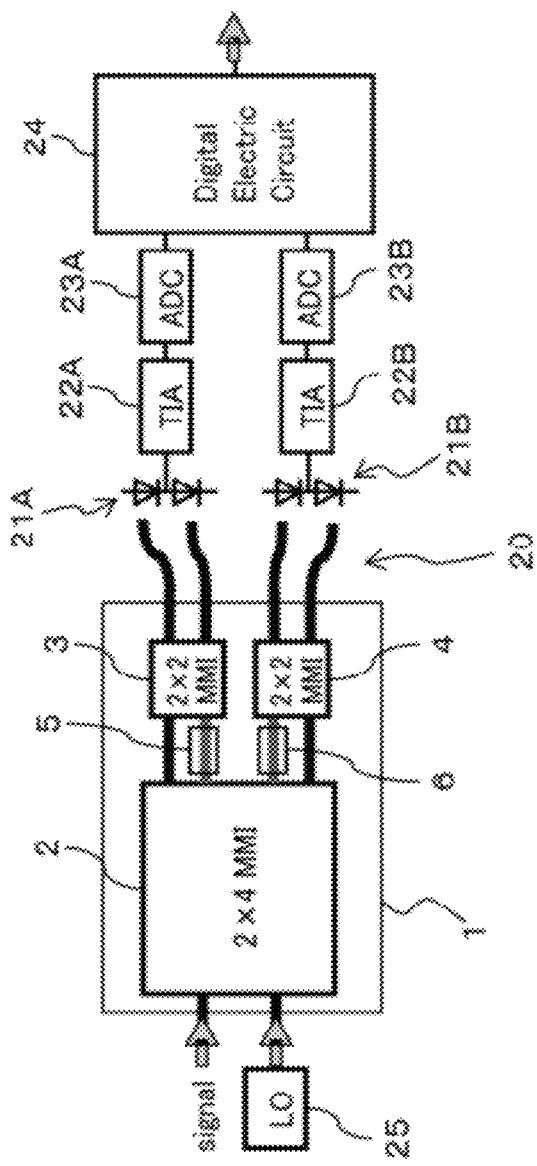
FIG. 9 is a schematic view illustrating a configuration of an optical receiver according to a second embodiment.

To this end, the present coherent optical receiver 20 includes, as illustrated in FIG. 9, the optical hybrid circuit 1 of the first embodiment described hereinabove, photodiodes (photoelectric conversion sections) 21A and 21B, trans-impedance amplifiers (TIAs) 22A and 22B, AD conversion circuits (AD conversion sections; analog digital converters (ADCs)) 23A and 23B, and a digital arithmetic circuit (digital arithmetic section; digital electric circuit) 24.

Here, the optical hybrid circuit 1 includes an MMI coupler 2 to convert QPSK signal light into a pair of first optical signals having an in-phase relationship with each other and a pair of second optical signals having an in-phase relationship with each other; an optical coupler 3 to convert the first optical signals into a pair of third optical signals having a 45-degree phase relationship with each other; and an optical coupler 4 to convert the second optical signals into a pair of fourth optical signals having a 135-degree phase relationship with each other [refer to FIG. 1A].

Here, the MMI coupler 2 is a 2×4 MMI coupler (or a 4×4 MMI coupler). Meanwhile, the optical couplers 3 and 4 are 2×2 MMI couplers. The optical hybrid circuit 1 is constructed from an optical semiconductor device.

In the present embodiment, as illustrated in FIG. 9, QPSK signal light is inputted to one input-side channel of the 2×4 MMI coupler 2 (or the 4×4 MMI coupler), and LO light is inputted to the other input-side channel of the 2×4 MMI coupler 2 (or the 4×4 MMI coupler). In other words, the one input-side channel of the 2×4 MMI coupler 2 (or the 4×4 MMI coupler) of the optical hybrid circuit 1 is a channel to input QPSK signal light. Meanwhile, the other input-side channel of the 2×4 MMI coupler 2 (or the 4×4 MMI coupler) of the optical hybrid circuit 1 is a channel to input LO light.

Therefore, the present optical receiver 20 further includes a local oscillation light generation section (LO light source) 25 to input LO light to the other input-side channel of the 2×4 MMI coupler 2 (or the 4×4 MMI coupler) of the optical hybrid circuit 1.

Thus, when QPSK signal light (QPSK signal pulse) and LO light synchronized in time with the QPSK signal light are inputted to the optical hybrid circuit 1, one of output forms having different branching ratios from each other is obtained in accordance with the relative phase difference $\Delta\rho$ between the QPSK signal light and the LO light. Accordingly, they are inputted to the respective photodiodes 21A and 21B in different states. Here, where the relative phase difference $\Delta\rho$ is 0, $\pi$, $-\pi/2$ and $+\pi/2$, the output intensity ratio of the optical hybrid circuit 1 is 0:2:1:1, 2:0:1:1, 1:1:0:2 and 1:1:2:0, respectively.

The photodiodes 21A and 21B are photodiodes to photoelectrically convert pairs of optical signals outputted from the multimode interference coupler 2 and the optical couplers 3 and 4 of the optical hybrid circuit 1 into analog electric signals (analog current signals).

Here, for photoelectric conversion and signal demodulation, the balanced photodiodes (BPDs) 21A and 21B are provided at the succeeding stage of the optical hybrid circuit 1.

Here, each of the BPDs 21A and 21B includes two photodiodes (PDs). If an optical signal is inputted only to one of the PDs in each of the BPDs 21A and 21B, then current corresponding to "1" flows, but if an optical signal is inputted only to the other PD, current corresponding to "-1" flows. However, if an optical signal is inputted to both of the PDs simultaneously, then no current flows. Therefore, when optical signals having different output intensity ratios are inputted from the optical hybrid circuit 1 to the two BPDs 21A and 21B, electric signals of different patterns are outputted from the two BPDs 21A and 21B in accordance with the relative phase difference $\Delta\phi$. In particular, phase information of the QPSK signal light is identified and converted into electric signals of different patterns by the two BPDs 21A and 21B.

In particular, the first BPD 21A is coupled to the first and second output-side channels of the optical hybrid circuit 1. In other words, the first BPD 21A is coupled to the first and second channels of the optical hybrid circuit 1 from which a pair of third optical signals (I-component, in-phase signals) having phases displaced by 180 degrees from each other is outputted.

Furthermore, the second BPD 21B is coupled to the third and fourth output-side channels of the optical hybrid circuit 1. In other words, the second BPD 21B is coupled to the third and fourth channels of the optical hybrid circuit 1 from which a pair of fourth optical signals (Q-component, quadrature signals) having phases displaced by 90 degrees with respect to the pair of third optical signals is outputted.

Trans-impedance amplifiers 22A and 22B are provided between the photodiodes 21A and 21B and the AD conversion circuits 23A and 23B, respectively. More specifically, the trans-impedance amplifiers 22A and 22B are coupled to the photodiodes 21A and 21B, and to the AD conversion circuits 23A and 23B. The trans-impedance amplifiers 22A and 22B are adapted to convert the analog current signals output from the photodiodes 21A and 21B into analog voltage signals (analog electric signals).

The AD conversion circuits 23A and 23B are AD conversion circuits that convert the analog electric signals that are output from the photodiodes 21A and 21B and then undergo the conversion at the trans-impedance amplifiers 22A and 22B, into digital electric signals. In other words, the AD conversion circuits 23A and 23B are adapted to convert the analog electric signals that are output from the trans-impedance amplifiers 22A and 22B, into digital electric signals.

The digital arithmetic circuit 24 is a digital arithmetic circuit (digital signal processing circuit), by using the digital electric signals outputted from the AD conversion circuits 23A and 23B, to execute an arithmetic operation for estimating information of received signal light.

Since the present optical receiver 20 is configured in such a manner as described above, it receives an optical signal in the following manner (light receiving method).

In particular, the multimode interference coupler 2 (a 2×4 MMI coupler or a 4×4 MMI coupler) of the optical hybrid circuit 1 is used to convert QPSK signal light (multilevel modulation signal light) into a pair of first optical signals having an in-phase relationship with each other and a pair of second optical signals having an in-phase relationship with each other.

Subsequently, the phase difference between at least one pair of optical signals of the pair of first optical signals and the pair of second optical signals is controlled by the phase controlling regions 5 and 6 provided on at least one of one of the pair of first output channels and one of the pair of second output channels of the multimode interference coupler 2.

In this case, the phase difference between the pair of first optical signals is controlled by the phase controlling region 5 provided at one of the pair of first output channels of the 2×4 MMI coupler 2, and the phase difference between the pair of second optical signals is controlled by the phase controlling region 6 provided at one of the pair of second output channels of the 2×4 MMI coupler 2.

Subsequently, using the optical coupler 3 (2×2 MMI coupler having a branching ratio of 85:15), the pair of first optical signals is converted into a pair of third optical signals having a 45-degree phase relationship with each other. Further, using the second optical coupler 4 (here, 2×2 MMI coupler having a branching ratio of 85:15), the pair of second optical signals is converted into a pair of fourth optical signals having 135-degree phase relationship with each other.

The pair of third optical signals and the pair of fourth optical signals are then received.

It is to be noted that, since details of the optical hybrid circuit 1 are similar to those of the first embodiment described hereinabove, description of the same is omitted here.

As described hereinabove, the optical receiver and the light receiving method according to the present embodiment are advantageous in that the reception efficiencies can be equalized between I-component and Q-component in the optical hybrid circuit 1, since the losses can be equalized between the I-component and the Q-component. In other words, since the losses are well balanced between I-component and Q-component in optical hybrid circuit 1 in the present embodiment, the currents flowing through the two BPDs 21A and 21B are also well balanced. Accordingly, phase information of the QPSK signal light is precisely identified and converted into electric signals of different patterns by the two BPDs 21A and 21B. This helps to equalize the reception efficiencies between the I-component and the Q-component.

Particularly, the present optical receiver and light receiving method are advantageous in that an optical receiver and a light receiving method can be implemented which exhibit a low wavelength dependency and a low phase displacement characteristic (a wide band characteristic of an operating wavelength) at a wider wavelength bandwidth, and are compact and suitable for monolithic integration.

In this manner, the present optical receiver and light receiving method can achieve an optical receiver and a light receiving method exhibiting an excellent loss balance between I-component and Q-component and operating at a wider wavelength band range (particularly, operating across the C band).

Further, while the description of the embodiment described above is given taking an optical receiver 20 as an example, the optical receiver is not limited to this, but also it is possible to configure an optical transceiver which includes the configuration of the optical receiver of the embodiment described hereinabove.

It is to be noted that, while, in the embodiment described above, the optical hybrid circuit 1 is constructed from an optical semiconductor device including the MMI coupler 2, the optical couplers 3 and 4, and the phase controlling regions 5 and 6, the optical semiconductor device is not limited to this. For example, the optical semiconductor device which includes the MMI coupler 2, the optical couplers 3 and 4, and the phase controlling regions 5 and 6 may additionally include photodiodes (here BPDs) 21A and 21B integrated therein. In other words, the MMI coupler 2, the optical couplers 3 and 4, the phase controlling regions 5 and 6, and the photodiodes (here BPDs) 21A and 21B may be monolithically integrated.

Figure 7A:
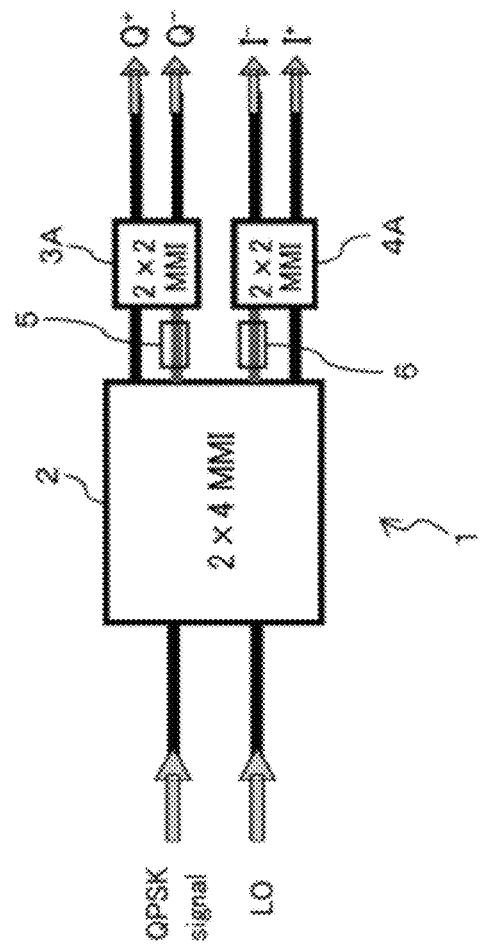
FIG. 7A is a schematic view illustrating a configuration of an optical hybrid circuit according to a modification to the first embodiment.

Further, the modifications to the first embodiment described hereinabove [refer to FIG. 7A and FIG. 8, for example] can be applied also to the optical hybrid circuit according to the present embodiment.

Third Embodiment

Now, an optical hybrid circuit according to a third embodiment will be described with reference to FIG. 10.

The optical hybrid circuit according to the present embodiment is different from that of the first embodiment described hereinabove in that, while, in the optical hybrid circuit of the first embodiment, QPSK signal light (multilevel modulation signal light) and LO light are inputted in a synchronized relationship with each other in time, in the optical hybrid circuit according to the present embodiment, a differential quadrature phase shift keying (DQPSK) signal light (differential multilevel modulation signal light, differential quadrature phase shift keying signal light) is inputted.

In other words, in the present embodiment, an 90-degree hybrid used to identify phase modulation information of a DQPSK signal in an optical transmission system will be described as an example of an optical hybrid circuit.

Figure 10:
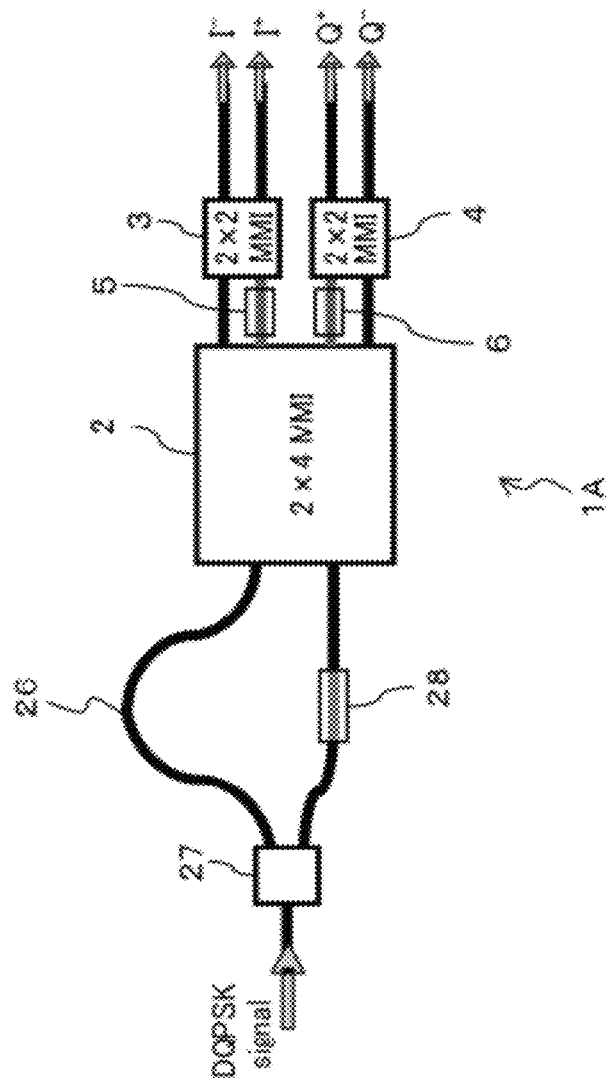
FIG. 10 is a schematic view illustrating a configuration of an optical hybrid circuit according to a third embodiment.

To this end, as illustrated in FIG. 10, the present optical hybrid circuit 1A includes, in addition to the configuration of the optical hybrid circuit 1 of the first embodiment described hereinabove [refer to FIG. 1A], a light delay circuit 26, and a 1×2 optical coupler (third optical coupler) 27 having one channel on the input side thereof and having two channels on the output side thereof, and a phase controlling region 28. In other words, the present optical hybrid circuit 1A is configured such that the 1×2 optical coupler 27 is coupled in a cascade coupling at the preceding stage (front end portion) of the 2×4 MMI coupler 2 included in the optical hybrid circuit 1 of the first embodiment described hereinabove through the light delay circuit 26, and the phase controlling region 28 is provided between the 1×2 optical coupler 27 and the 2×4 MMI coupler 2. It is to be noted that, similarly to the first embodiment described hereinabove, the optical hybrid circuit 1 is constructed from an optical semiconductor device which includes the MMI coupler 2, the optical couplers 3 and 4, and the phase controlling region 5 and 6. It is to be noted that, in FIG. 10, like elements to those of the first embodiment described above [refer to FIG. 1A] are denoted by like reference characters.

Here, the light delay circuit 26 is coupled to one of the input-side channels of the 2×4 MMI coupler 2 included in the optical hybrid circuit 1 of the first embodiment described hereinabove.

The 1×2 optical coupler 27 is coupled to the light delay circuit 26 and the other input-side channel of the 2×4 MMI coupler 2. Here, the 1×2 optical coupler 27 is a 1×2 MMI coupler.

In particular, the length of one waveguide which couples one of the input channels of the 2×4 MMI coupler 2 and one of the output channels of the 1×2 optical coupler 27 is set greater than the length of the other optical waveguide which couples the other input channel of the 2×4 MMI coupler 2 and the other output channels of the 1×2 optical coupler 27.

In particular, the two optical waveguides (arms) which couple the two input ports of the 2×4 MMI coupler 2 and the two output ports of the 1×2 MMI coupler 27 are different in length (optical path length) from each other.

Here, the length of one of the optical waveguides is made longer to provide an optical path length difference which corresponds to delay of one bit of a DQPSK signal pulse. To this end, the light delay circuit 26 is one of the optical waveguides which is coupled to one of the input channels of the 2×4 MMI coupler 2 included in the optical hybrid circuit 1 of the first embodiment described hereinabove.

The phase controlling region 28 is coupled to the other input-side channel of the 2×4 MMI coupler 2 included in the optical hybrid circuit 1 of the first embodiment described hereinabove, and is adapted to induce a phase shift of $-\pi/4 + t*\pi$ (t is an integer). A phase shifter is provided in the phase controlling region 28. The phase shift amount $\theta_L$ of the phase shifter 28 is $-\pi/4$ (radian). In this manner, the phase shifter 28 to induce a phase shift of $-\pi/4$ (radian) is provided inside the delayed interferometer.

A phase shifter that shifts the phase by varying the optical path length or a phase shifter that shifts the phase by varying the reflective index of the waveguide may be used as the phase shifter 28. For example, a delayed waveguide or a butterfly-type tapered waveguide having a varied width of the waveguide may be provided as the phase shifter 28. Further, in the phase controlling region, for example, electrodes may be provided to carry out phase control through current injection or voltage application, or heater electrodes may be provided to carry out phase control through application of heat.

Figure 11:
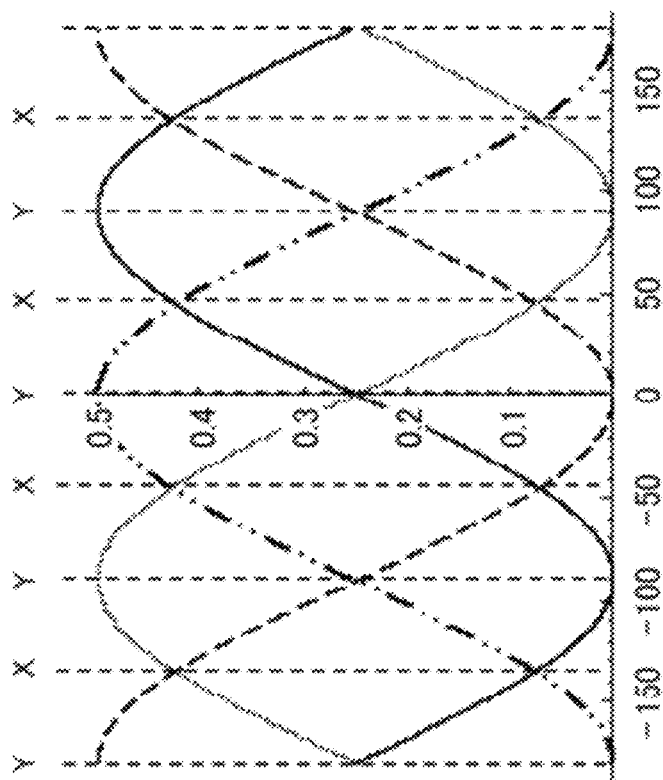
FIG. 11 is a diagram illustrating operating points in the optical hybrid circuit according to the third embodiment.

DQPSK signal light is inputted to the input-side channel of the 1×2 MMI coupler 27. Therefore, the input-side channel of the 1×2 MMI coupler 27 is an input channel to input DQPSK signal light. The DQPSK signal is branched into two paths through the 1×2 MMI coupler 27, and one of the branched DQPSK signal lights is delayed by one bit by the light delay circuit 26. Then, the two DQPSK signal lights are inputted to the 2×4 MMI coupler 2 in synchronism with each other in time. Here, by inducing a phase shift of $-\pi/4$ (radian) in the other DQPSK signal light by the phase shifter 28, the operating points are shifted from the operating points indicated by symbol X in FIG. 11 to operating points indicated by symbol Y, thereby setting to the optimized operating points Y. Thus, output forms having different branching ratios from each other are obtained by the circuit configuration including the 2×4 MMI coupler 2 and the succeeding circuit elements similar to those of the first embodiment described hereinabove. Accordingly, also the optical hybrid circuit 1A functions as a 90-degree hybrid similarly as in the case of the first embodiment described hereinabove.

It is to be noted that, since details of the other part are similar to those of the first embodiment described hereinabove, descriptions thereof will be omitted herein. Here, when the first embodiment described hereinabove is applied to the present embodiment, two DQPSK signal lights having a relative phase difference $\Delta\rho$ may be applied in place of the QPSK signal light and the LO light.

As described hereinabove, the optical hybrid circuit 1A according to the present embodiment is advantageous in that the losses can be equalized between I-component and Q-component, similarly as in the case of the first embodiment described hereinabove. Accordingly, an optical receiver using this optical hybrid circuit 1A can receive I-component and Q-component with comparable efficiencies.

Particularly, the present optical hybrid circuit 1A is advantageous in that a 90-degree hybrid can be implemented which exhibits a low wavelength dependency and a low phase displacement characteristic (a wide band characteristic of an operating wavelength) at a wider wavelength bandwidth, and is compact and suitable for monolithic integration.

In this manner, the present optical hybrid circuit 1A can achieve a 90-degree hybrid exhibiting an excellent loss balance between I-component and Q-component and operating at a wider wavelength band range (particularly, operating across the C band).

Further, the present optical hybrid circuit 1A has a superior compatibility with 90-degree hybrids currently used in optical receivers and detection systems, as well as being preferred in terms of the cost performance.

It is to be noted that, while, in the embodiment described above, a 1×2 MMI coupler is used as the 1×2 optical coupler 27 provided at the preceding stage to the 2×4 MMI coupler 2, the 1×2 optical coupler 27 is not limited to this. For example, it is possible to use a Y branching coupler, a 2×2 MMI coupler, a 2×2 directional coupler or the like in place of the 1×2 MMI coupler. Also in this instance, 90-degree hybrid operation can be obtained similarly as in the case of the embodiment described above.

Further, while, in the embodiment described above, the optical hybrid circuit 1A is configured such that it includes an optical semiconductor device which includes the MMI coupler 2, the optical couplers 3 and 4, and the phase controlling regions 5 and 6 similarly as in the first embodiment and the modification thereof described hereinabove, the optical hybrid circuit 1A is not limited to this. For example, the optical hybrid circuit 1A may otherwise be constructed from an optical semiconductor device which includes an MMI coupler 2, optical couplers 3 and 4, phase controlling regions 5 and 6, a light delay circuit 26, a 1×2 optical coupler 27, and a different phase controlling region 28.

Further, the modifications to the first embodiment described hereinabove [refer to FIG. 7A and FIG. 8, for example] can be applied also to the optical hybrid circuit according to the present embodiment.

Fourth Embodiment

Figure 12:
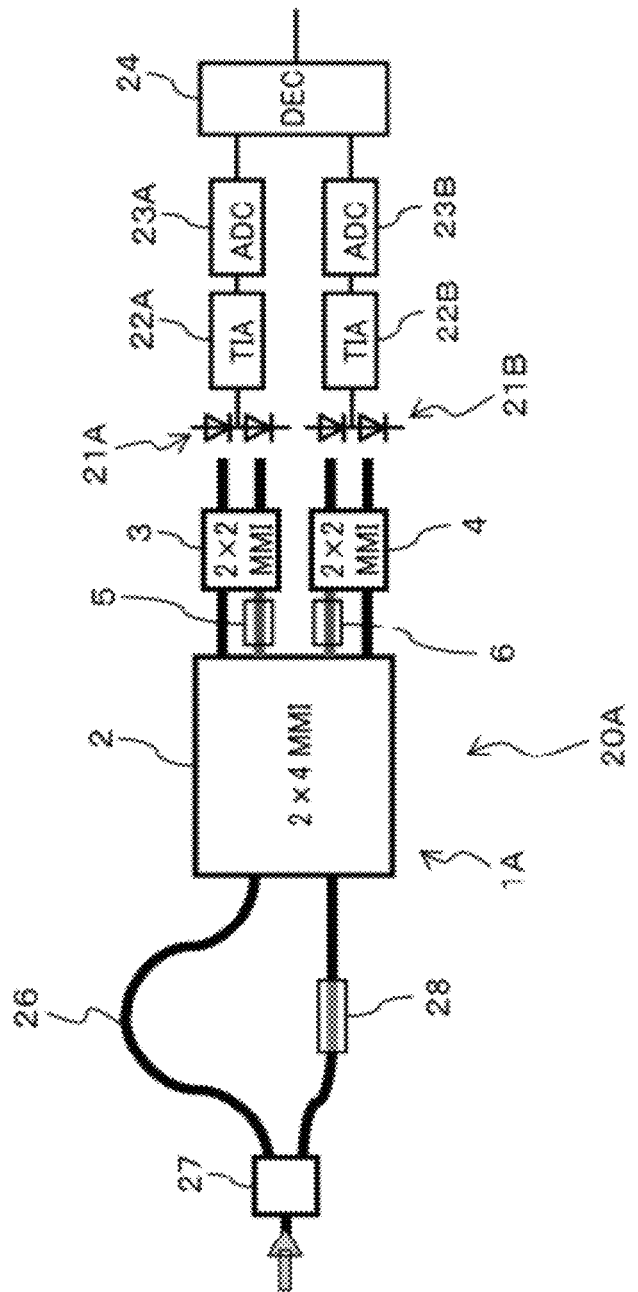
FIG. 12 is a schematic view illustrating a configuration of an optical receiver according to a fourth embodiment.

Now, an optical receiver, an optical transceiver, and a light reception method according to a fourth embodiment will be described with reference to FIG. 12.

The optical receiver according to the present embodiment is an optical receiver including the optical hybrid circuit 1A (90-degree hybrid for a DQPSK signal; refer to FIG. 10) of the third embodiment and the modification to the third embodiment described above as illustrated in FIG. 12. The optical receiver 20A is adapted to convert an optical signal identified by the 90-degree hybrid 1A into electric signals and carries out a digital signal processing.

To this end, the present optical receiver 20A includes the optical hybrid circuit 1A of the third embodiment and the modification to the third embodiment described hereinabove, photodiodes (photoelectric conversion sections) 21A and 21B, trans-impedance amplifiers (TIAs) 22A and 22B, AD conversion circuits (AD conversion sections; analog digital converters (ADCs)) 23A and 23B, and a digital arithmetic circuit (digital arithmetic section) 24.

It is to be noted that, since details of the optical hybrid circuit 1A are similar to those of the third embodiment and the modification to the third embodiment described hereinabove (refer to FIG. 10), description of the same is omitted here. Further, since the configuration and the light receiving method of the photodiodes 21A and 21B, the trans-impedance amplifiers 22A and 22B, the AD conversion circuits 23A and 23B, and the digital arithmetic circuit 24 are similar to those of the second embodiment and the modification to the second embodiment described above (refer to FIG. 9), descriptions thereof will be omitted herein. However, the optical receiver 20A does not include a local oscillation light generation section. Here, when the second embodiment and the modification to the second embodiment described hereinabove are applied to the present embodiment, two DQPSK signal lights having relative phase difference $\Delta\rho$ may be applied in place of the QPSK signal light and the LO light. It is to be noted that, in FIG. 12, like elements to those of the second embodiment [refer to FIG. 9] and the third embodiment [refer to FIG. 10] and the modifications thereto described hereinabove are denoted by like reference characters.

As described hereinabove, the optical receiver and the light receiving method according to the present embodiment are advantageous in that the reception efficiencies can be equalized between I-component and Q-component in the optical hybrid circuit 1, since the losses can be equalized between the I-component and the Q-component, similarly as in the case of the second embodiment described above. In other words, since the losses are well balanced between I-component and Q-component in optical hybrid circuit 1A in the present embodiment, the currents flowing through the two BPDs 21A and 21B are also well balanced. In particular, phase information of the QPSK signal light is precisely identified and converted into electric signals of different patterns by the two BPDs 21A and 21B. This helps to equalize the reception efficiencies between the I-component and the Q-component.

Particularly, the present optical receiver and light receiving method are advantageous in that an optical receiver and a light receiving method can be implemented which exhibit a low wavelength dependency and a low phase displacement characteristic (a wide band characteristic of an operating wavelength) at a wider wavelength bandwidth, and are compact and suitable for monolithic integration.

In this manner, the present optical receiver and light receiving method can achieve an optical receiver and a light receiving method exhibiting an excellent loss balance between I-component and Q-component and operating at a wider wavelength band range (particularly, operating across the C band).

It is to be noted that, while the foregoing description of the embodiment described above is given taking an optical receiver 20A as an example, this is not limiting, and also it is possible to form an optical transceiver which includes the components of the optical receiver of the embodiment described above similarly to the modification to the second embodiment described hereinabove.

It is to be noted that, while, in the embodiment described above, the optical hybrid circuit 1A is constructed from an optical semiconductor device including the MMI coupler 2, the optical couplers 3 and 4, and the phase controlling regions 5 and 6 (refer to the second embodiment), the optical semiconductor device is not limited to this. For example, the optical semiconductor device which includes the MMI coupler 2, the optical couplers 3 and 4, and the phase controlling regions 5 and 6 may additionally include photodiodes (here BPDs) 21A and 21B integrated therein. In other words, the MMI coupler 2, the optical couplers 3 and 4, the phase controlling regions 5 and 6, and the photodiodes (here BPDs) 21A and 21B may be monolithically integrated.

It is to be noted that, while, in the embodiment described above, the optical hybrid circuit 1A is formed from an optical semiconductor device which includes the MMI coupler 2, the optical couplers 3 and 4, the phase controlling regions 5 and 6, the light delay circuit 26, the 1×2 optical coupler 27, and the different phase controlling region 28 (refer to the third embodiment), the optical semiconductor device is not limited to this For example, the optical semiconductor device which includes the MMI coupler 2, the optical couplers 3 and 4, the phase controlling regions 5 and 6, the light delay circuit 26, the 1×2 optical coupler 27, and the different phase controlling region 28 may additionally include photodiodes (here BPDs) 21A and 21B integrated therein. In other words, the optical semiconductor device which includes the MMI coupler 2, the optical couplers 3 and 4, the phase controlling regions 5 and 6, the light delay circuit 26, the 1×2 optical coupler 27, the different phase controlling region 28, and the photodiodes (here BPDs) 21A and 21B may be monolithically integrated.

Others

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical hybrid circuit comprising:
    a multimode interference coupler including a pair of input channels provided at positions symmetrical with each other with respect to a center position in a widthwise direction thereof, a pair of first output channels adjacent with each other to output a pair of first optical signals having an in-phase relationship with each other, and a pair of second output channels adjacent with each other to output a pair of second optical signals having an in-phase relationship with each other, the multimode interference coupler being adapted to convert multilevel modulation signal light into the pair of first optical signals having an in-phase relationship with each other and the pair of second optical signals having an in-phase relationship with each other;
    a first optical coupler coupled to one of the first output channels and the second output channels, having two channels on the input side thereof and two channels on the output side thereof, and having a branching ratio of 85:15 or 15:85, the first optical coupler being adapted to convert the first optical signals into a pair of third optical signals having a 45- or 135-degree phase relationship with each other;
    a second optical coupler coupled to the other of the first output channels and the second output channels, having two channels on the input side thereof and two channels on the output side thereof, and having a same branching ratio as the branching ratio of the first optical coupler, the second optical coupler being adapted to convert the second optical signals into a pair of fourth optical signals having a 135- or 45-degree phase relationship with each other; and
    at least one phase controlling region provided on at least one of one of the pair of first output channels and one of the pair of second output channels.

2. The optical hybrid circuit according to claim 1, comprising a first phase controlling region provided on one of the pair of first output channels and a second phase controlling region provided on one of the pair of second output channels, as the at least one phase controlling region.

3. The optical hybrid circuit according to claim 2, wherein the first phase controlling region is a region to control the phase such that a phase difference between the pair of first optical signals is $\pi/2+s^*\pi$ (s is an integer), and the second phase controlling region is a region to control the phase such that a phase difference between the pair of second optical signals is $\pi/2+p^*\pi$ (p is an integer).

4. The optical hybrid circuit according to claim 1, wherein the at least one phase controlling region is a region to control the phase such that one of the phase difference between the pair of first optical signals and the phase difference between the pair of second optical signals is $\pi/2+s^*\pi$ (s is an integer), and the multimode interference coupler is adapted such that the other of the phase difference between the pair of first optical signals and the phase difference between the pair of second optical signals is $\pi/2+p^*\pi$ (p is an integer).

5. The optical hybrid circuit according to claim 1, wherein the multimode interference coupler is a multimode interference coupler which has two channels on the input side thereof and has four channels on the output side thereof.

6. The optical hybrid circuit according to claim 5, wherein the multimode interference coupler is a multimode interference coupler based on paired interference.

7. The optical hybrid circuit according to claim 1, wherein the multimode interference coupler is a multimode interference coupler which has four channels on the input side thereof and has four channels on the output side thereof, and two of the four channels on the input side which are provided at symmetrical positions with respect to the center position in the widthwise direction are input channels for inputting light.

8. The optical hybrid circuit according to claim 1, wherein the first optical coupler and the second optical coupler are multimode interference couplers or directional couplers.

9. The optical hybrid circuit according to claim 1, wherein one of the input-side channels of the multimode interference coupler is an input channel to input the multilevel modulation signal light, and the other input-side channel of the multimode interference coupler is an input channel to input local oscillation light.

10. The optical hybrid circuit according to claim 1, further comprising:
    a light delay circuit coupled to one of the input-side channels of the multimode interference coupler;
    a third optical coupler coupled to the light delay circuit and the other input-side channel of the multimode interference coupler and having one channel on the input side thereof and two channels on the output side thereof; and
    a different phase controlling region provided on the other input-side channel of the multimode interference coupler, the different phase controlling region adapted to induce a phase shift of $-\pi/4+t*\pi$ (t is an integer), wherein the input-side channel of the third optical coupler is an input channel to input differential multilevel modulation signal light.

11. The optical hybrid circuit according to claim 1, configured from an optical semiconductor device including the multimode interference coupler, the first optical coupler, the second optical coupler, and the phase controlling region, the optical semiconductor device having a waveguide structure.

12. An optical receiver comprising:
an optical hybrid circuit comprising:
a multimode interference coupler including a pair of input channels provided at positions symmetrical with each other with respect to a center position in a widthwise direction thereof, a pair of first output channels adjacent with each other to output a pair of first optical signals having an in-phase relationship with each other, and a pair of second output channels adjacent with each other to output a pair of second optical signals having an in-phase relationship with each other, the multimode interference coupler being adapted to convert multilevel modulation signal light into the pair of first optical signals having an in-phase relationship with each other and the pair of second optical signals having an in-phase relationship with each other;
a first optical coupler coupled to one of the first output channels and the second output channels, having two channels on the input side thereof and two channels on the output side thereof, and having a branching ratio of 85:15 or 15:85, the first optical coupler being adapted to convert the first optical signals into a pair of third optical signals having a 45- or 135-degree phase relationship with each other;
a second optical coupler coupled to the other of the first output channels and the second output channels, having two channels on the input side thereof and two channels on the output side thereof, and having a same branching ratio as the branching ratio of the first optical coupler, the second optical coupler being adapted to convert the second optical signals into a pair of fourth optical signals having a 135- or 45-degree phase relationship with each other; and
at least one phase controlling region provided on at least one of one of the pair of first output channels and one of the pair of second output channels;
a photodiode adapted to convert the third optical signals outputted from the first optical coupler and the fourth optical signals outputted from the second optical coupler into an analog electric signal;
an analog-digital conversion circuit adapted to convert the analog electric signal outputted from the photodiode into a digital electric signal; and
a digital electric circuit adapted to execute arithmetic processing using the digital electric signal outputted from the analog-digital conversion circuit.

13. The optical receiver according to claim 12, further comprising a trans-impedance amplifier coupled to the photodiode,
wherein the analog-digital conversion circuit is configured to convert the analog electric signal outputted from the photodiode and inputted via the trans-impedance amplifier into the digital electric signal.

14. The optical receiver according to claim 12, wherein one of the input-side channels of the multimode interference coupler is an input channel to input the multilevel modulation signal light, the other input-side channel of the multimode interference coupler is an input channel to input local oscillation light, and the optical receiver further comprises a local oscillation light generation section to input the local oscillation light to the other input-side channel of the multimode interference coupler.

15. The optical receiver according to claim 12, wherein the optical hybrid circuit comprises:
a light delay circuit coupled to one of the input-side channels of the multimode interference coupler;
a third optical coupler coupled to the light delay circuit and the other input-side channel of the multimode interference coupler and having one channel on the input side thereof and two channels on the output side thereof; and
a different phase controlling region provided on the other input-side channel of the multimode interference coupler, the different phase controlling region adapted to induce a phase shift of $-\pi/4+t*\pi$ (t is an integer),
wherein the input-side channel of the third optical coupler is an input channel to input differential multilevel modulation signal light.

16. The optical receiver according to claim 12, wherein the optical hybrid circuit is constructed from an optical semiconductor device including the multimode interference coupler, the first optical coupler, the second optical coupler, and the phase controlling region.

17. The optical receiver according to claim 15, wherein the optical hybrid circuit is constructed from an optical semiconductor device including the multimode interference coupler, the first optical coupler, the second optical coupler, the phase controlling region, the light delay circuit, the third coupler, and the different phase controlling region.

18. The optical receiver according to claim 16, wherein the optical semiconductor device further including the photodiode integrated therein.

19. An optical transceiver comprising:
an optical hybrid circuit comprising:
a multimode interference coupler including a pair of input channels provided at positions symmetrical with each other with respect to a center position in a widthwise direction thereof, a pair of first output channels adjacent with each other to output a pair of first optical signals having an in-phase relationship with each other, and a pair of second output channels adjacent with each other to output a pair of second optical signals having an in-phase relationship with each other, the multimode interference coupler being adapted to convert multilevel modulation signal light into the pair of first optical signals having an in-phase relationship with each other and the pair of second optical signals having an in-phase relationship with each other;
a first optical coupler coupled to one of the first output channels and the second output channels, having two channels on the input side thereof and two channels on the output side thereof, and having a branching ratio of 85:15 or 15:85, the first optical coupler being adapted to convert the first optical signals into a pair of third optical signals having a 45- or 135-degree phase relationship with each other;
a second optical coupler coupled to the other of the first output channels and the second output channels, having two channels on the input side thereof and two channels on the output side thereof, and having a same branching ratio as the branching ratio of the first optical coupler, the second optical coupler being adapted to convert the second optical signals into a pair of fourth optical signals having a 135- or 45-degree phase relationship with each other; and at least one phase controlling region provided on at least one of one of the pair of first output channels and one of the pair of second output channels;

a photodiode adapted to convert the third optical signals outputted from the first optical coupler and the fourth optical signals outputted from the second optical coupler into an analog electric signal;

an analog-digital conversion circuit adapted to convert the analog electric signal outputted from the photodiode into a digital electric signal; and a digital electric circuit adapted to execute arithmetic processing using the digital electric signal outputted from the analog-digital conversion circuit.

20. A light receiving method comprising:

converting, using a multimode interference coupler including a pair of input channels provided at positions symmetrical with each other with respect to a center position in a widthwise direction thereof, a pair of first output channels adjacent with each other to output a pair of first optical signals having an in-phase relationship with each other, and a pair of second output channels adjacent with each other to output a pair of second optical signals having an in-phase relationship with each other, multi-level modulation signal light into the pair of first optical signals having an in-phase relationship with each other and the pair of second optical signals having an in-phase relationship with each other;

controlling a phase difference between a pair of optical signals of at least one of the pair of first optical signals and the pair of second optical signals, with at least one phase controlling region provided on at least one of one of the pair of first output channels and one of the pair of second output channels;

converting the pair of first optical signals into a pair of third optical signals having a 45- or 135-degree phase relationship with each other, using a first optical coupler coupled to one of the first output channels and the second output channels, having two channels on the input side thereof and two channels on the output side thereof, and having a branching ratio of 85:15 or 15:85;

converting the pair of second optical signals into a pair of fourth optical signals having a 135- or 45-degree phase relationship with each other, using a second optical coupler coupled to the other of the first output channels and the second output channels, having two channels on the input side thereof and two channels on the output side thereof, and having a same branching ratio as the branching ratio of the first optical coupler; and receiving the pair of third optical signals and the pair of fourth optical signals.

* * * * *